(12) United States Patent
Abdelrazek et al.

(10) Patent No.: US 10,554,048 B2
(45) Date of Patent: Feb. 4, 2020

(54) BATTERY ENERGY STORAGE SYSTEM CONTROLLER SYSTEMS AND METHODS

(71) Applicants: Sherif Abdelmageed Abdelrazek, Charlotte, NC (US); Sukumar Kamalasadan, Concord, NC (US); Johan H. R. Enslin, Huntersville, NC (US); Daniel Blair Sowder, Bainbridge Island, WA (US)

(72) Inventors: Sherif Abdelmageed Abdelrazek, Charlotte, NC (US); Sukumar Kamalasadan, Concord, NC (US); Johan H. R. Enslin, Huntersville, NC (US); Daniel Blair Sowder, Bainbridge Island, WA (US)

(73) Assignees: UNIVERSITY OF NORTH CAROLINA AT CHARLOTTE, Charlotte, NC (US); DUKE ENERGY CORPORATION, Charlotte, NC (US)

(*) Notice: Subject to any disclaimer, the term of this patent is extended or adjusted under 35 U.S.C. 154(b) by 263 days.

(21) Appl. No.: 15/370,464

(22) Filed: Dec. 6, 2016

(65) Prior Publication Data
US 2017/0085091 A1 Mar. 23, 2017

Related U.S. Application Data

(63) Continuation-in-part of application No. 14/714,933, filed on May 18, 2015, now Pat. No. 9,843,189.
(Continued)

(51) Int. Cl.
*H02J 3/32* (2006.01)
*H02J 3/38* (2006.01)
*H02J 3/00* (2006.01)

(52) U.S. Cl.
CPC .......... *H02J 3/383* (2013.01); *H02J 3/00* (2013.01); *H02J 3/32* (2013.01); *H02J 3/386* (2013.01);
(Continued)

(58) Field of Classification Search
CPC .... H02J 3/32; H02J 3/383; H02J 3/386; H02J 2003/003; H02J 2003/007; H02J 7/0057;
(Continued)

(56) References Cited

U.S. PATENT DOCUMENTS

| | | | |
|---|---|---|---|
| 9,957,018 B1* | 5/2018 | Angeliev | H02J 1/00 |
| 2004/0267466 A1* | 12/2004 | Enis | F03D 7/0284 |
| | | | 702/60 |
| 2007/0080666 A1* | 4/2007 | Ritter | H02J 3/32 |
| | | | 320/128 |
| 2011/0013427 A1* | 1/2011 | Weir | H02J 3/32 |
| | | | 363/37 |

(Continued)

*Primary Examiner* — Levi Gannon
(74) *Attorney, Agent, or Firm* — Clements Bernard Walker PLLC; Christopher L. Bernard

(57) ABSTRACT

An energy storage system controller, including: an energy storage system coupled to a power distribution system; and a processor in communication with the energy storage system, wherein the processor executes: a renewables capacity firming algorithm operable for conditioning intermittent power of a renewable energy station using real time and historical input data such that it is made more stable and non-intermittent, optionally utilizing one or more parameter values associated with comparable time periods taking into account one or more factors comprising cloud state; and a peak load shaving algorithm operable for ensuring that the energy storage system is capable of transmitting full power capacity at a predicted feeder peak load time determined by the processor from real time and historical input data; wherein the performance of the renewables capacity firming algorithm and the performance of the peak load shaving algorithm are optimized in parallel.

15 Claims, 34 Drawing Sheets

Related U.S. Application Data

(60) Provisional application No. 62/263,857, filed on Dec. 7, 2015, provisional application No. 62/361,180, filed on Jul. 12, 2016.

(52) U.S. Cl.
CPC ... *H02J 2003/003* (2013.01); *H02J 2003/007* (2013.01); *Y02E 10/563* (2013.01); *Y02E 10/566* (2013.01); *Y02E 10/763* (2013.01); *Y02E 40/10* (2013.01); *Y02E 60/76* (2013.01); *Y02E 70/30* (2013.01); *Y04S 40/22* (2013.01)

(58) Field of Classification Search
CPC .... H02J 7/0073; Y02E 10/563; Y02E 10/566; Y02E 10/763; Y02E 10/766; Y02E 40/10; Y02E 60/76; Y02E 70/30; Y04S 40/22
See application file for complete search history.

(56) References Cited

U.S. PATENT DOCUMENTS

| | | | |
|---|---|---|---|
| 2012/0245744 A1* | 9/2012 | Prosser | H02J 3/46 700/286 |
| 2012/0248873 A1* | 10/2012 | Oudalov | H02J 3/32 307/52 |
| 2014/0025215 A1* | 1/2014 | Carlson | H02J 3/383 700/292 |
| 2014/0067151 A1* | 3/2014 | Erhart | G05F 1/66 700/297 |
| 2015/0188482 A1* | 7/2015 | Berkowitz | H02J 3/383 320/101 |
| 2015/0261892 A1* | 9/2015 | Bozchalui | G06F 17/5004 703/1 |
| 2016/0056628 A1* | 2/2016 | Burstall | G05B 15/02 700/295 |
| 2016/0218511 A1* | 7/2016 | Li | H02J 3/32 |
| 2017/0005515 A1* | 1/2017 | Sanders | H02J 3/381 |

* cited by examiner

| | | | | | | | |
|---|---|---|---|---|---|---|---|
| Feeder Regulators Operation (No ESS) | 0.974 | 1.003 | 0.988 | 1.01 | 2 | 7 | 8 |
| ESS Compensation | 0.978 | 1 | 0.986 | 1.0051 | 0 | 1 | 3 |

*FIG. 11*

BATTERY ENERGY STORAGE SYSTEM CONTROLLER SYSTEMS AND METHODS

CROSS-REFERENCE TO RELATED APPLICATIONS

The present patent application/patent is a continuation-in-part (CIP) of co-pending U.S. patent application Ser. No. 14/714,933, filed on May 18, 2015, and entitled "GRID TIED BATTERY ENERGY STORAGE SYSTEM CONTROLLER SYSTEMS AND METHODS," the contents of which are incorporated in full by reference herein. The present patent application/patent also claims the benefit of priority of U.S. Provisional Patent Application No. 62/263,857, filed on Dec. 7, 2015, and entitled "MULTIPLE FUNCTION ENERGY STORAGE SYSTEM ACTIVE POWER CONTROLLER," the contents of which are also incorporated in full by reference herein. The present patent application/patent further claims the benefit of priority of U.S. Provisional Patent Application No. 62/361,180, filed on Jul. 12, 2016, and entitled "CLOUD STATE PATTERN RECOGNITION AIDED PV CAPACITY FIRMING OPTIMIZATION UTILIZING ENERGY STORAGE SYSTEMS," the contents of which are further incorporated in full by reference herein.

FIELD OF THE DISCLOSURE

The present disclosure relates generally to the energy storage field. More specifically, the present disclosure relates to battery energy storage system (BESS) and active power controller systems and methods.

BACKGROUND OF THE DISCLOSURE

In general, there is great interest in developing and implementing improved BESS controllers that are capable of directing the inverters of energy storage systems (ESSs) to dispatch active and reactive power in a manner that benefits a distribution system and a utility. This involves three important functions: 1) photovoltaic (PV) station capacity firming, 2) voltage support, and 3) energy time shift. PV station capacity firming involves suppressing large power swings that could potentially harm utility generation units. Voltage support involves providing a tighter voltage band across a feeder on which an ESS is installed. Voltage support also aims to reduce feeder voltage regulator tap changes, leading to an increase in regulator life. Finally, energy time shift involves performing peak load shaving by storing energy at times when cost is low and discharging energy at feeder peak load times. Thus, what is still needed in the art is a new way in which a grid tied BESS can be controlled and used.

What is also still needed in the art is a BESS controller that handles dispatching active power based on input data streams from a feeder on which the BESS is installed. The controller should dispatch the BESS' energy based on the daily fulfillment of two main BESS functions together. The performance of these two functions should be optimized in parallel. The first function is renewables capacity firming (RCF), where the intermittent power of a renewable energy station (photovoltaic or wind) is conditioned to become fairly stable or non-intermittent. The second function is peak load shaving (PLS), where the controller optimizes battery energy during the performance of RCF to be able to dispatch its full power capacity at the predicted feeder peak load time that is predicted by the controller from historical data. The controller should be completely unsupervised and should not require any human intervention for its operation. Real time data streams should allow the controller to perform smart decisions that contribute to value maximization for grid operators.

BRIEF SUMMARY OF THE DISCLOSURE

In various exemplary embodiments, the present disclosure provides such improved BESS controllers that are capable of directing the inverters of ESSs to dispatch active and reactive power in a manner that benefits the distribution system and the utility. This involves three important functions: 1) PV station capacity firming, 2) voltage support, and 3) energy time shift. PV station capacity firming accordingly involves suppressing large power swings that could potentially harm utility generation units. Voltage support accordingly involves providing a tighter voltage band across a feeder on which an ESS is installed. Voltage support also accordingly aims to reduce feeder voltage regulator tap changes, leading to an increase in regulator life. Finally, energy time shift accordingly involves performing peak load shaving by storing energy at times when cost is low and discharging energy at feeder peak load times. Thus, the present disclosure provides a new way in which a grid tied BESS can be controlled and used.

In one exemplary embodiment, the present disclosure provides a battery energy storage system control system, including: logic coupled to a photovoltaic station and an energy storage system and executing a photovoltaic station capacity firming algorithm operable for making a combined output of the photovoltaic station and the energy storage system substantially constant such that power swings on an associated feeder system are avoided; logic coupled to the photovoltaic station and the energy storage system and executing a voltage support algorithm operable for holding point of common coupling voltage and phase values substantially equal to substation voltage and phase values via power injection or removal; and logic coupled to the photovoltaic station and the energy storage system and executing an energy time shift algorithm operable for storing energy during periods of relatively low demand and providing energy during periods of relatively high demand. The photovoltaic station capacity firming algorithm derives an optimal reference power output curve from historical data. The energy storage system supplements power output of the photovoltaic station to substantially match the optimal reference power output curve. The photovoltaic station capacity firming algorithm includes intermittency detection logic that idles the energy storage system when a power output of the photovoltaic station is sufficiently constant. The voltage support algorithm monitors the point of common coupling voltage and phase values and the substation voltage and phase values in real time. The energy time shift algorithm calculates a probable time of peak load on a given feeder based on historical data and begins energy storage system discharge at a corresponding predetermined time to ensure peak load shaving.

In another exemplary embodiment, the present disclosure provides a battery energy storage system control method, including: making a combined output of the photovoltaic station and the energy storage system substantially constant such that power swings on an associated feeder system are avoided via logic coupled to a photovoltaic station and an energy storage system using a photovoltaic station capacity firming algorithm; holding point of common coupling voltage and phase values substantially equal to substation voltage and phase values via power injection or removal via logic coupled to the photovoltaic station and the energy storage system using a voltage support algorithm; and storing energy during periods of relatively low demand and providing energy during periods of relatively high demand via logic coupled to the photovoltaic station and the energy storage system using an energy time shift algorithm. The photovoltaic station capacity firming algorithm derives an optimal reference power output curve from historical data. The energy storage system supplements power output of the photovoltaic station to substantially match the optimal reference power output curve. The photovoltaic station capacity firming algorithm includes intermittency detection logic that idles the energy storage system when a power output of the photovoltaic station is sufficiently constant. The voltage support algorithm monitors the point of common coupling voltage and phase values and the substation voltage and phase values in real time. The energy time shift algorithm calculates a probable time of peak load on a given feeder based on historical data and begins energy storage system discharge at a corresponding predetermined time to ensure peak load shaving.

In a further exemplary embodiment, the present disclosure provides an energy delivery system, including: a photovoltaic station; an energy storage system; logic coupled to the photovoltaic station and the energy storage system and executing a photovoltaic station capacity firming algorithm operable for making a combined output of the photovoltaic station and the energy storage system substantially constant such that power swings on an associated feeder system are avoided; logic coupled to the photovoltaic station and the energy storage system and executing a voltage support algorithm operable for holding point of common coupling voltage and phase values substantially equal to substation voltage and phase values via power injection or removal; and logic coupled to the photovoltaic station and the energy storage system and executing an energy time shift algorithm operable for storing energy during periods of relatively low demand and providing energy during periods of relatively high demand. The photovoltaic station capacity firming algorithm derives an optimal reference power output curve from historical data. The energy storage system supplements power output of the photovoltaic station to substantially match the optimal reference power output curve. The photovoltaic station capacity firming algorithm includes intermittency detection logic that idles the energy storage system when a power output of the photovoltaic station is sufficiently constant. The voltage support algorithm monitors the point of common coupling voltage and phase values and the substation voltage and phase values in real time. The energy time shift algorithm calculates a probable time of peak load on a given feeder based on historical data and begins energy storage system discharge at a corresponding predetermined time to ensure peak load shaving.

In various exemplary embodiments, the present disclosure also provides a BESS controller that handles dispatching the BESS' active power based on input data streams from the feeder on which the BESS is installed. The controller dispatches the BESS' energy based on the daily fulfillment of two main BESS functions together. The performance of these two functions is optimized in parallel. The first function is RCF, where the intermittent power of a renewable energy station (photovoltaic or wind) is conditioned to become fairly stable or non-intermittent. The second function is PLS where the controller optimizes battery energy during the performance of RCF to be able to dispatch its full power capacity at the predicted feeder peak load time that is predicted by the controller from historical data. The controller is completely unsupervised and does not require any human intervention for its operation. Real time data streams allow the controller to perform smart decisions that contribute to value maximization for grid operators.

In a still further exemplary embodiment, the present disclosure provides an energy storage system controller, including: an energy storage system coupled to a power distribution system; and a processor in communication with the energy storage system, wherein the processor executes: a renewables capacity firming algorithm operable for conditioning intermittent power of a renewable energy station using real time and historical input data such that it is made more stable and non-intermittent; and a peak load shaving algorithm operable for ensuring that the energy storage system is capable of transmitting full power capacity at a predicted feeder peak load time determined by the processor from real time and historical input data; wherein the performance of the renewables capacity firming algorithm and the performance of the peak load shaving algorithm are optimized in parallel; and wherein energy is selectively transferred between the energy storage system and the power distribution system at the direction of the processor. Optionally, the renewable energy station includes one of a photovoltaic energy station and a wind energy station. The renewables capacity firming algorithm is operable for determining a reference power value to determine optimal power output of the energy storage system during power swings taking into account renewable energy station characteristics. The renewables capacity firming algorithm implements an adaptive filtering control methodology. The renewables capacity firming algorithm is operable for developing a characteristic power curve based on daily power output derived from the historical input data. The renewables capacity firming algorithm is operable for developing a firming power reference that considers real time power swing magnitudes, energy storage system capacity, and target state-of-charge at an end of a firming period. The renewables capacity firming algorithm is operable for implementing an intermittency detection algorithm that triggers the energy storage system to commence and halt firming based on an output ramp rate.

In various exemplary embodiments, the present disclosure further provides a low cost PV station capacity firming (PVCF) algorithm utilizing BESSs. The electronic process relies on two main stages. The first stage involves the analysis of historical PV station output and logged cloud state data for the purpose of identifying optimal algorithm parameters for each predetermined day type. Twenty-seven day types are classified according to cloud state patterns, for example. The second stage involves the utilization of web-based cloud state predictions to recognize day-ahead weather conditions and identify cloud state patterns. Optimal pre-calculated algorithm values, specific to identified cloud patterns, including starting state-of-charge (SoC) and firming reference ramp rate limits, are applied for firming maximization. Algorithm simulation and implementation results are presented and discussed. Thus, the present disclosure provides an optimal state of charge and a firm reference weighting factor.

In a still further exemplary embodiment, the present disclosure provides an energy storage system controller, including: an energy storage system coupled to a power distribution system; and a processor in communication with the energy storage system, wherein the processor executes: a renewables capacity firming algorithm operable for conditioning intermittent power of a renewable energy station using real time and historical input data such that it is made more stable and non-intermittent, wherein the renewables capacity firming algorithm utilizes one or more parameter values associated with comparable time periods taking into account one or more factors including cloud state; and a peak load shaving algorithm operable for ensuring that the energy storage system is capable of transmitting full power capacity at a predicted feeder peak load time determined by the processor from real time and historical input data; wherein the performance of the renewables capacity firming algorithm and the performance of the peak load shaving algorithm are optimized in parallel; and wherein energy is selectively transferred between the energy storage system and the power distribution system at the direction of the processor. Optionally, the renewable energy station includes one of a photovoltaic energy station and a wind energy station. The renewables capacity firming algorithm is operable for determining a reference power value to determine optimal power output of the energy storage system during power swings taking into account renewable energy station characteristics. The renewables capacity firming algorithm implements an adaptive filtering control methodology. The renewables capacity firming algorithm is operable for developing a characteristic power curve based on daily power output derived from the historical input data. The renewables capacity firming algorithm is operable for developing a firming power reference that considers real time power swing magnitudes, energy storage system capacity, and target state-of-charge at an end of a firming period. The renewables capacity firming algorithm is operable for implementing an intermittency detection algorithm that triggers the energy storage system to commence and halt firming based on an output ramp rate. The renewables capacity firming algorithm utilizes one or more parameters based on predefined day types and associated cloud cover characteristics correlating to power requirements.

BRIEF DESCRIPTION OF THE DRAWINGS

The present disclosure is illustrated and described herein with reference to the various drawings, in which like reference numbers are used to denote like system components/method steps, as appropriate, and in which:

FIG. 11 is a table illustrating a comparison of feeder voltage levels and regulator tap changes with and without ESS voltage support;

DETAILED DESCRIPTION OF THE DISCLOSURE

Figure 1:
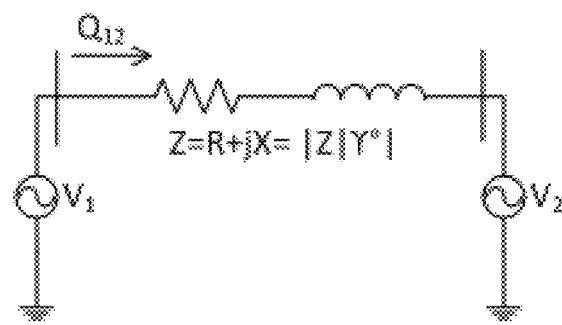
FIG. 1 is a schematic diagram illustrating a two bus system and depicting reactive power transmission.

In various exemplary embodiments, the present disclosure provides a complete battery energy storage management scheme that maximizes the potential value that can be brought to medium voltage feeders and the like. The potential performance benefits include improved system reliability, improved dynamic stability, enhanced power quality, transmission capacity enhancement, and improved area protection. The coordination of ancillary service applications, mainly voltage support, along with other applications like PV capacity firming and ETS, represents significant innovation, as the choice of applications acting at a given instance is dictated by grid need. This maximizes the value of the ESS to the feeder.

The PV station capacity firming algorithm involves supplying (i.e. discharging) and consuming (i.e. charging) power in a manner that makes the combined output of the PV station and the ESS constant to some extent. This serves to reduce large power swings on the feeder, which could cause generation units to destabilize if proper control action is not taken. The algorithm relies on recording several days of PV output data and analyzing it to obtain an optimal reference power output curve to which the ESS aims to modify the PV output. The resulting firmed capacity offsets the need to purchase or 'rent' additional dispatchable electric supply resources (i.e. capacity). Depending on location, firmed renewable energy output may also offset the need for transmission and/or distribution equipment. Renewables capacity firming is especially valuable when peak demand occurs.

The BESS control algorithm for PVCF aims to minimize PV station power swings. The PVCF algorithm focuses on large power swings occurring at noon, for example, when PV output is at its peak. These swings are the most crucial to minimize transients at substation generation units.

The PVCF algorithm develops the characteristic maximum PV curve for the PV station location at that time of year. For a daily output power of PV station $P_k(t)$, where k signifies the day; k=1, 2, 3, 4, . . . n; the characteristic maximum PV curve is given by:

$$P_m(t) = \max(P_1(t), P_2(t), P_3(t) \ldots P_n(t)) \quad (1)$$

Further, the smoothed characteristic maximum power curve (SCMPC) is defined as:

$$P_{SCMP}(t) = \begin{cases} P_m(t) & \text{for } L_l < \frac{\Delta P_m(t)}{\Delta t} < U_l \\ U_l \Delta t + P_m(t - \Delta t) & \text{for } \frac{\Delta P_m(t)}{\Delta t} > U_l \\ L_l \Delta t + P_m(t - \Delta t) & \text{for } \frac{\Delta P_m(t)}{\Delta t} < L_l \end{cases} \quad (2)$$

$$P_{OPR}(t) = m \times P_{SCMP}(t) \quad (3)$$

where $\Delta t$ is the sampling time of the PV power output measurement—in our case it is 30 sec, for example. $U_l$ and $L_l$ are the maximum allowed rate of increase and decrease of the SCMPC, respectively. The PV optimum power reference curve (OPR) is a fraction of the SCMP curve. The multiplication factor m is chosen such that maximum firming is attained for the described PV station from the used ESS. The multiplication factor m is also varied to optimize the ESS state of charge at the end of the daytime to allow sufficient charge for other battery functions.

Intermittency detection allows one to idle the battery during times when PV output power is smooth and does not require any conditioning. The intermittency detection algorithm relies on constantly tracking the rate of change of the difference $P_c$ between the output PV power and the OPF curve. The real time measured values of $P_c$ are passed through a low pass filter, which rejects sudden power fluctuations to obtain $P_{cf}$. $P_{cf}$ is then subtracted from $P_c$ to obtain D. If the value of D violates an upper or lower limit, intermittency is then assumed to be present and firming is commenced. Smoothing continues till value of D is maintained within limits for a period $T_d$.

$$P_c(t) = P_{pv}(t) - P_{OPR}(t) \quad (4)$$

$$P_{cf}(t) = \begin{cases} P_c(t) & \text{for } L_{l2} < \frac{\Delta P_c(t)}{\Delta t} < U_{l2} \\ U_l \Delta t + P_c(t - \Delta t) & \text{for } \frac{\Delta P_c(t)}{\Delta t} > U_{l2} \\ L_l \Delta t + P_c(t - \Delta t) & \text{for } \frac{\Delta P_c(t)}{\Delta t} < L_{l2} \end{cases} \quad (5)$$

$$D(t) = P_c(t) - P_{cf}(t) \quad (6)$$

Figure 4:
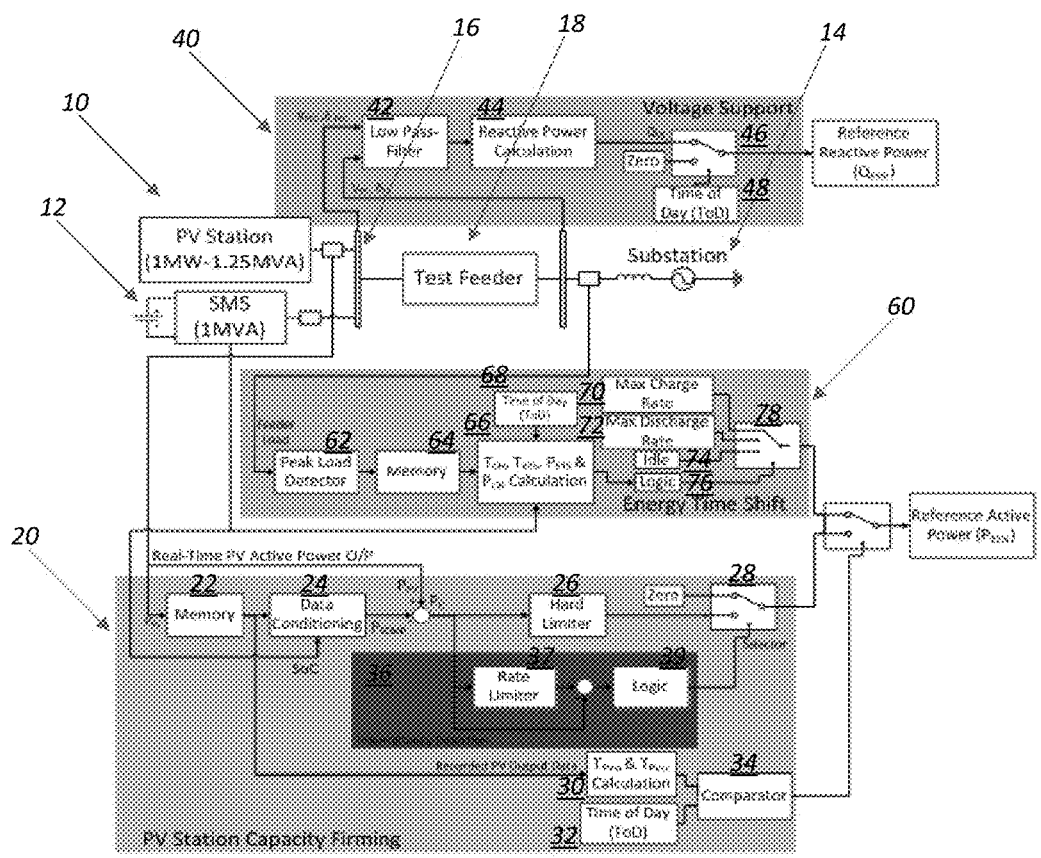
FIG. 4 is a schematic diagram illustrating the PV station capacity firming, voltage support, and energy time shift (ETS) functionalities of the present disclosure.
Figure 5:
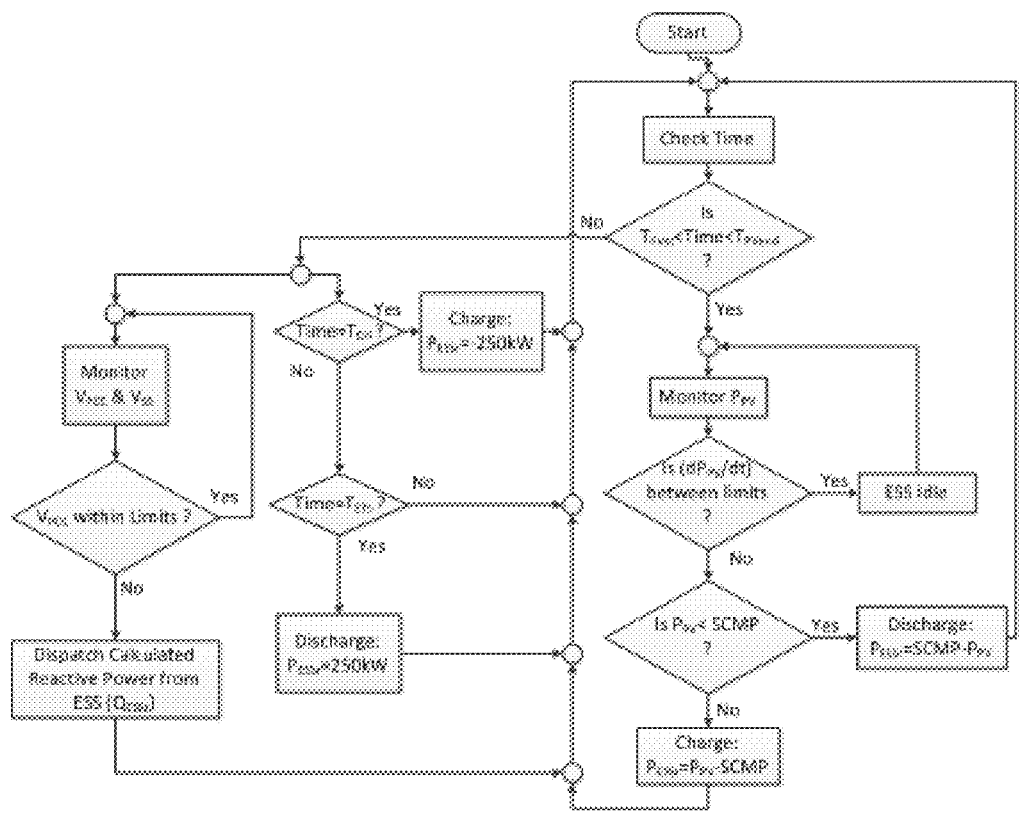
FIG. 5 is a flowchart illustrating BESS control for the PV station capacity firming, voltage support, and ETS functionalities of the present disclosure.

FIGS. 4 and 5 graphically represent this PVCF mechanism and algorithm, respectively. Referring specifically to FIG. 4, the PV station capacity firming control block 20 is coupled to the PV station 10 and the ESS 12, as well as the substation 14 through a point of common coupling (PCC) 16 and a test feeder 18. The PVCF block 20 includes a memory 22, a data conditioning block 24, a hard limiter 26, a selection block 28, a calculation block 30, a timing block 32, a comparator 34, and an intermittency detection block 36, which includes a rate limiter 37 and appropriate logic 39.

Voltage support represents one of the main and most important applications benefiting utilities and grid operators. Maintaining the voltage within permissible levels is of utmost importance to utilities. Radial networks exhibit voltage depression as the distance from the substation increases. Utilities invest considerable amounts of money on capacitor banks and static VAR compensators to keep voltage levels steady within the permissible band. These devices generate reactive power to counter reactive power sinks represented in feeder lines and poor power factor loads connected to the grid, like fans, air conditioning systems, washers, and dryers, for example. Utilities also invest in numerous voltage regulators (VRs) and load tap changers (LTCs) per feeder. These devices vary the number of turns connected to their primary or secondary windings in order either to buck or boost the voltage, depending on the need. Unfortunately, each tap change for such devices decreases their remaining life, which forces utilities to invest in new VRs and LTCs after a shorter period of time. Since VRs and LTCs operate relatively slower than VAR compensators, the disclosed ESS controller voltage support function can compensate for reactive power leading to voltage band tightening, which, in turn, leads to a decreased total number of regulator operations and tap changes.

The voltage support algorithm relies on comparing the PCC voltage and phase values to the substation voltage and phase values. The required reactive power to be injected or drained to hold the voltage at the same value of that of the substation is calculated and set as a reference value $Q_{essr}$ for the BESS.

The reactive power $Q_{12}$ transmitted in a two bus system from bus 1 to bus 2, shown in FIG. 1, is given by:

$$Q_{12} = \frac{|V_1|^2}{|Z|} \sin Y - \frac{|V_1||V_2|}{|Z|} \sin(Y + \delta_1 - \delta_2) \quad (7)$$

where $\delta_1$ and $\delta_2$ are the respective voltage angles at buses 1 and 2. Feeder resistance is relatively small as compared to inductance, so the feeder lines are assumed to be fully reactive, i.e. (R=0, Z=jX). Equation 7 becomes:

$$Q_{12} = \frac{|V_1|^2}{X} - \frac{|V_1||V_2|}{X}\cos(\delta_1 - \delta_2) \quad (8)$$

Figure 2:
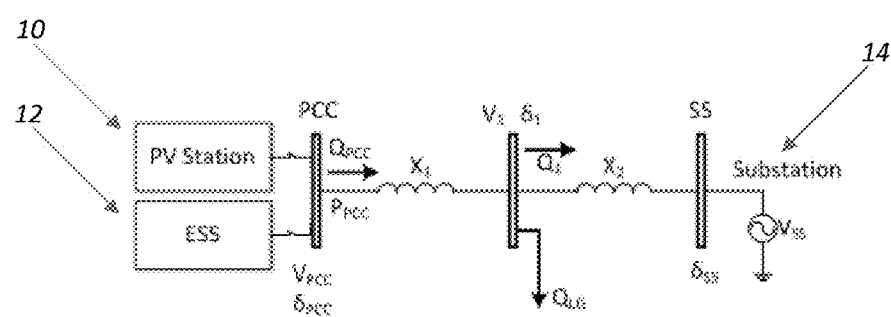
FIG. 2 is a schematic diagram illustrating an aggregated model of a medium voltage feeder.

Applying Equation 8 to the system in FIG. 2, one gets:

$$Q_1 = \frac{|V_1|^2}{X_2} - \frac{|V_1||V_{ss}|}{X_2}\cos(\delta_1 - \delta_{ss}) + \quad (9)$$
$$\frac{|V_1|^2}{X_1} - \frac{|V_1||V_{PCC}|}{X_1}\cos(\delta_1 - \delta_{PCC}) + Q_{LG} = 0$$

$$Q_{PCC} = \frac{|V_{PCC}|^2}{X_1} - \frac{|V_{PCC}||V_1|}{X_1}\cos(\delta_{PCC} - \delta_1) \quad (10)$$

From Equations 9 and 10, one gets:

$$Q_{PCC} = \frac{|V_{PCC}|^2}{X_1} - \frac{|V_1||V_{SS}|}{X_2}\cos(\delta_1 - \delta_{SS}) + \frac{|V_1|^2}{X_2} + \frac{|V_1|^2}{X_1} + Q_{LG} \quad (11)$$

The goal is to calculate the reactive power to be injected at the PCC to attain a voltage equal to the voltage at the substation. So, we equate $V_{PCC}$ to $V_{SS}$ in Equation 11. Under this condition, we assume the voltage at bus 1 to be 1 pu. The active power injected at PCC is zero, since active power supplied by the ESS is zero during voltage support. Equation 12 represents the approximate reactive power amount to be injected at the PCC to attain a voltage equal to that at the substation:

$$Q_{PCC} = \frac{|V_{SS}|^2}{X_1} - \frac{|V_{SS}|}{X_2}\cos(\delta_{PCC} - \delta_{SS}) + \frac{1}{X_1} + \frac{1}{X_2} + Q_{LG} \quad (12)$$

Voltage at the substation and the PCC is constantly monitored. $Q_{PCC}$ is calculated during operation and given to the ESS as a reference to support the voltage at the PCC. The reactance and reactive power $Q_{LG}$ at the bus 1 term in Equation 12 is considered as a constant in real time and is tuned till optimum reactive power support is attained.

FIGS. 4 and 5 graphically represent this voltage support mechanism and algorithm, respectively. Referring specifically to FIG. 4, the voltage support control block 40 is coupled to the PV station 10 and the ESS 12, as well as the substation 14 through a point of common coupling (PCC) 16 and a test feeder 18. The voltage support block 40 includes a low-pass filter (LPF) 42, a reactive power calculator 44, a selection block 46, and a timing block 48.

The energy time shift application aims to provide an innovative way for utilities to store energy at time when it is least needed, i.e. cheap, and provide it in times when it is most needed by consumers, i.e. expensive. The algorithm calculates the most probable time of peak load on a certain feeder and begins battery discharge at a suitable time to ensure peak load shaving. This leads to several advantages, such as offsetting the need to buy new generation units and decreasing the cost of power generation.

Figure 3:
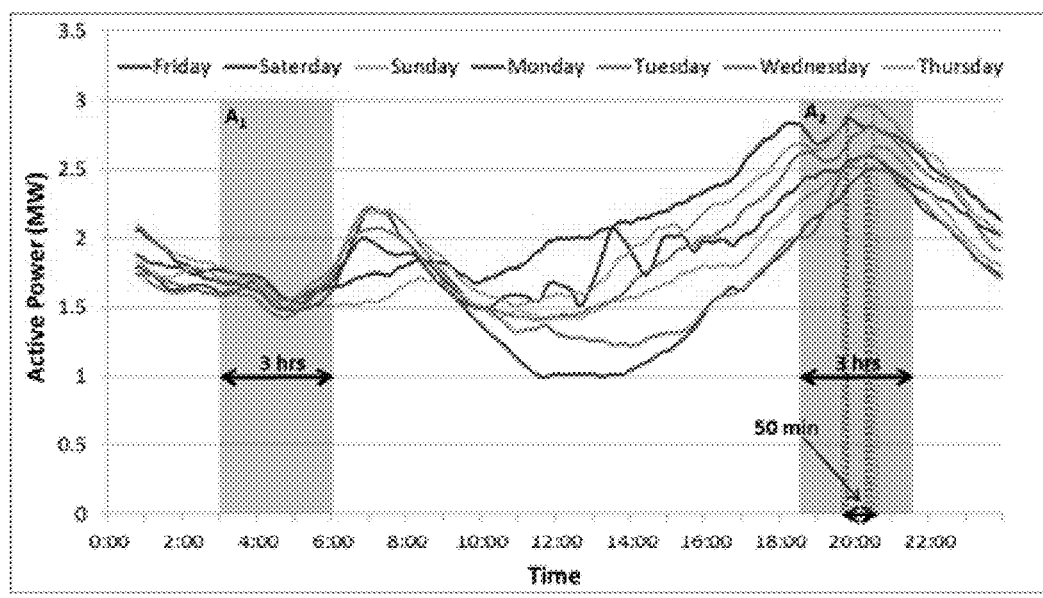
FIG. 3 is a plot illustrating the load curves of a practical feeder in a residential area for the week of Sep. 21, 2012, by way of example.

Studying the load curves of a practical feeder over one week's interval, for example, it was found that the time difference between load peak maximums of two consecutive days was less than 40 minutes, whereas the maximum difference throughout the week was found to be 50 minutes, as shown in FIG. 3.

Relying on this realization, the ETS application was designed such that the discharge period of the ESS is determined by the load curve maximum of the previous day. The algorithm checks the battery state of charge SoC and calculates the time of day to commence battery discharge, such that the load curve maximum of the previous day lies in the middle of the discharge time interval:

$$T_{Dstart} = T_{Lpeak} - \frac{(SoC) \times E_{Cap}}{2 \times P_D} \quad (13)$$

Assuming the battery is fully charged and will perform ETS at 250 kW, for example, the total time of discharge is 3 hours. This covers the load curve peak time difference between the two consecutive days. Also, since load curves of most days show minimal load at 4:30 am, the ETS algorithm is set to start charging the battery at 3 am to avoid the local maximum that occurs at 7:00 am.

FIGS. 4 and 5 graphically represent this ETS mechanism and algorithm, respectively. Referring specifically to FIG. 4, the ETS control block 60 is coupled to the PV station 10 and the ESS 12, as well as the substation 14 through a point of common coupling (PCC) 16 and a test feeder 18. The ETS block 60 includes a peak load detector block 62, a memory block 64, a calculation block 66, a timing block 68, a maximum charge rate block 70, a maximum discharge rate block 72, an idle block 74, appropriate logic 76, and a selector block 78.

Figure 6:
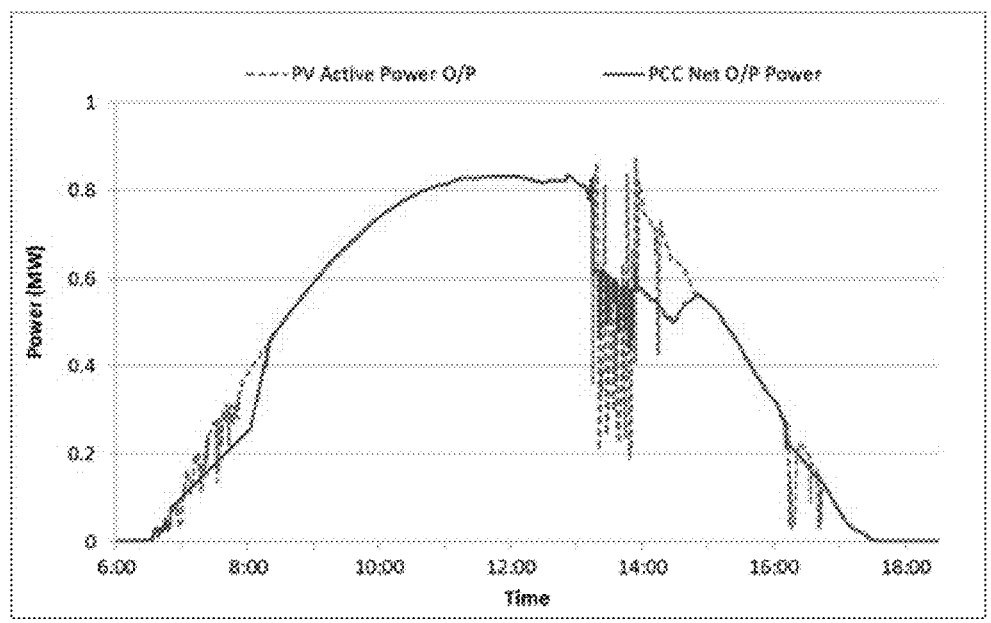
FIG. 6 is a plot illustrating PV station capacity firming simulation results for PCC active power output after PV station capacity firming as compared to PV power output with no ESS intervention.
Figure 7:
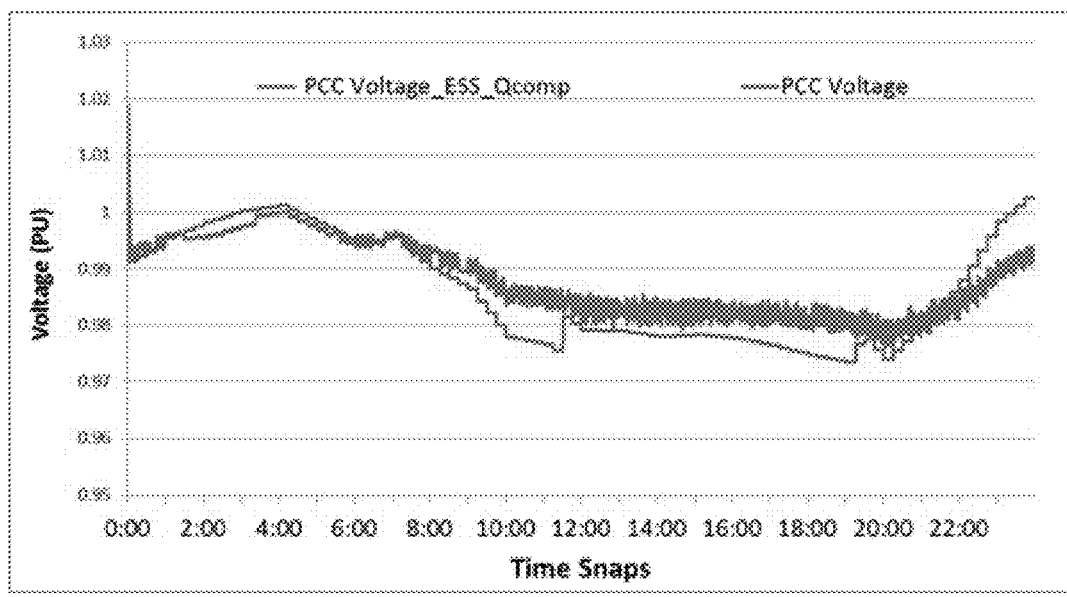
FIG. 7 is a plot illustrating voltage profile at PCC with and without ESS voltage support.
Figure 8:
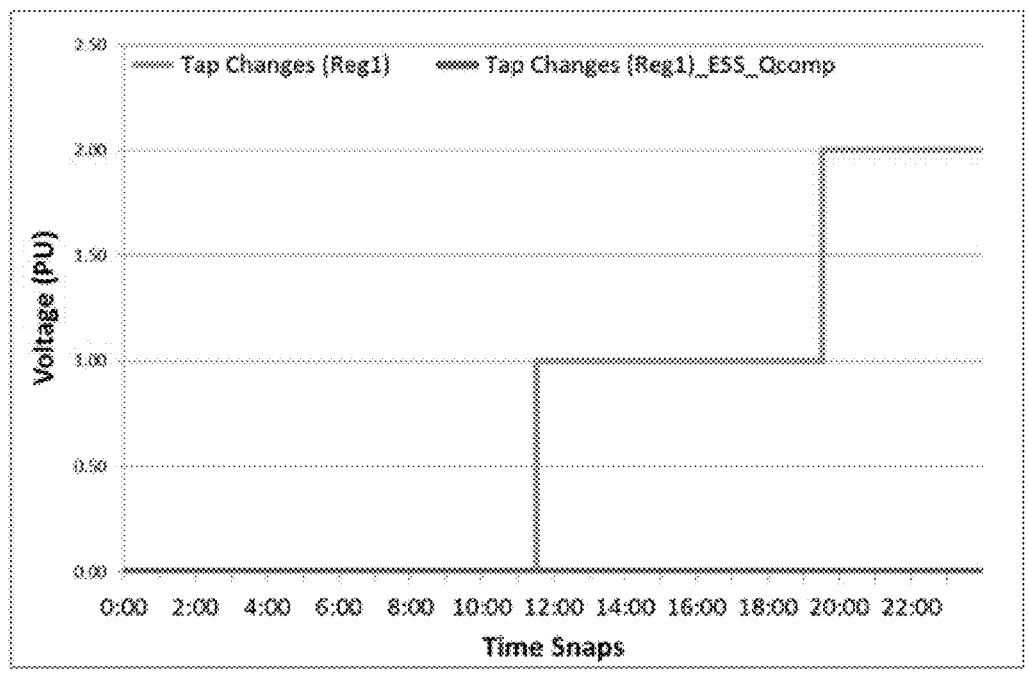
FIG. 8 is a plot illustrating tap changes of a first feeder voltage regulator with and without ESS voltage support.
Figure 9:
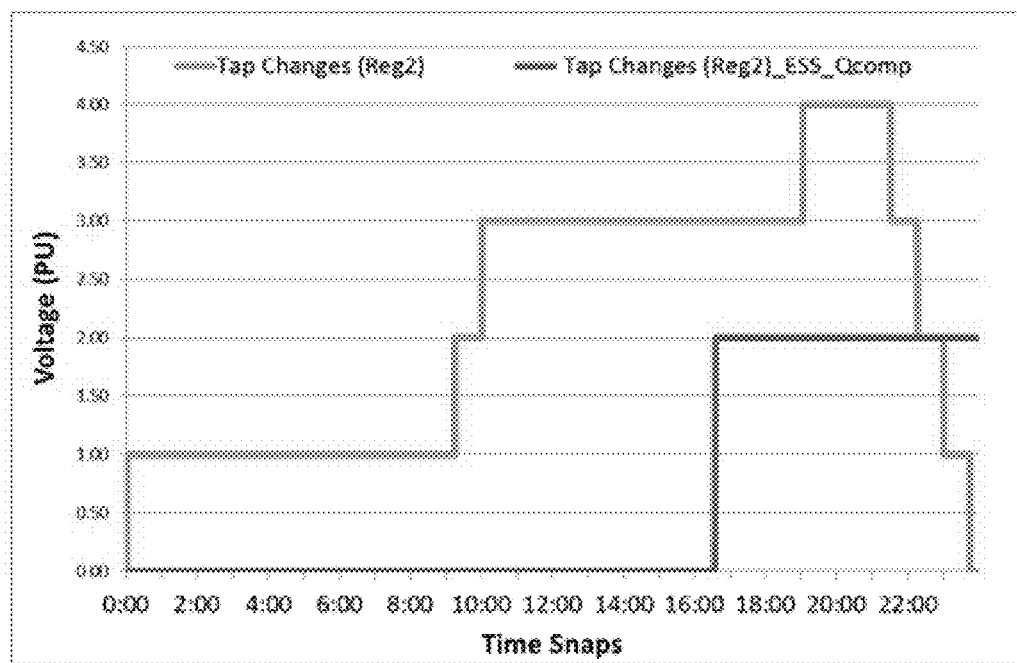
FIG. 9 is a plot illustrating tap changes of a second feeder voltage regulator with and without ESS voltage support.
Figure 10:
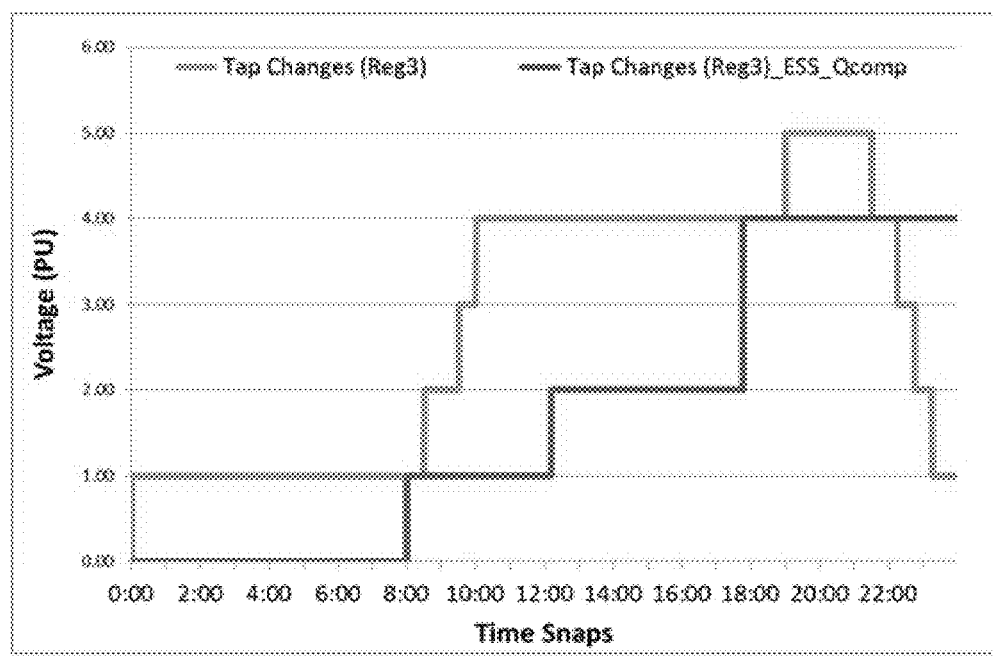
FIG. 10 is a plot illustrating tap changes of a third feeder voltage regulator with and without ESS voltage support.
Figure 12:
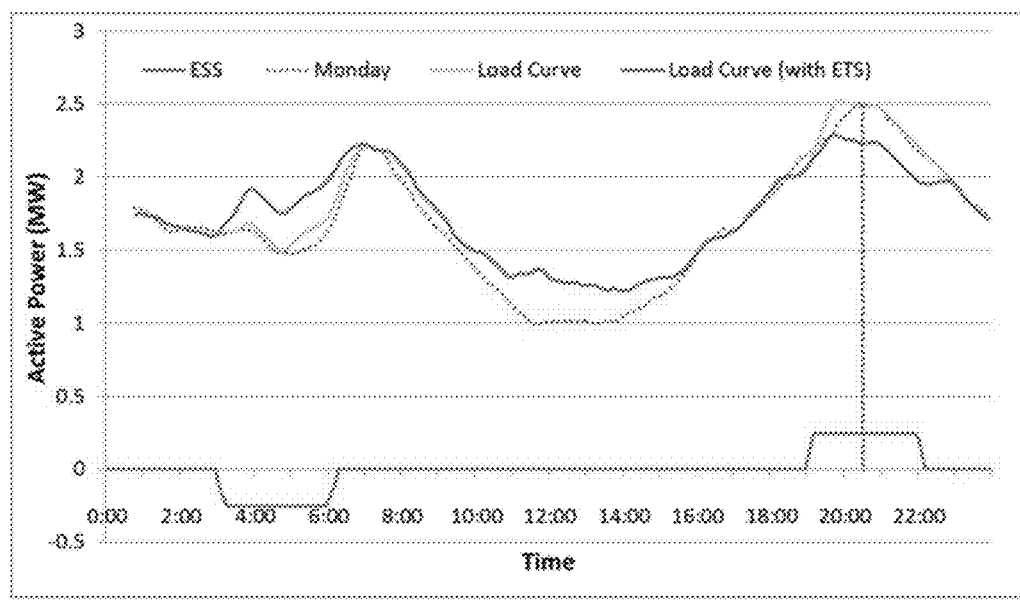
FIG. 12 is a plot illustrating a comparison of feeder load curves with and without ESS energy time shift.

In terms of results, FIG. 6 is a plot illustrating PV station capacity firming simulation results for PCC active power output after PV station capacity firming as compared to PV power output with no ESS intervention. FIG. 7 is a plot illustrating voltage profile at PCC with and without ESS voltage support. FIG. 8 is a plot illustrating tap changes of a first feeder voltage regulator with and without ESS voltage support. FIG. 9 is a plot illustrating tap changes of a second feeder voltage regulator with and without ESS voltage support. FIG. 10 is a plot illustrating tap changes of a third feeder voltage regulator with and without ESS voltage support. FIG. 11 is a table illustrating a comparison of feeder voltage levels and regulator tap changes with and without ESS voltage support. Finally, FIG. 12 is a plot illustrating a comparison of feeder load curves with and without ESS energy time shift.

Figure 13:
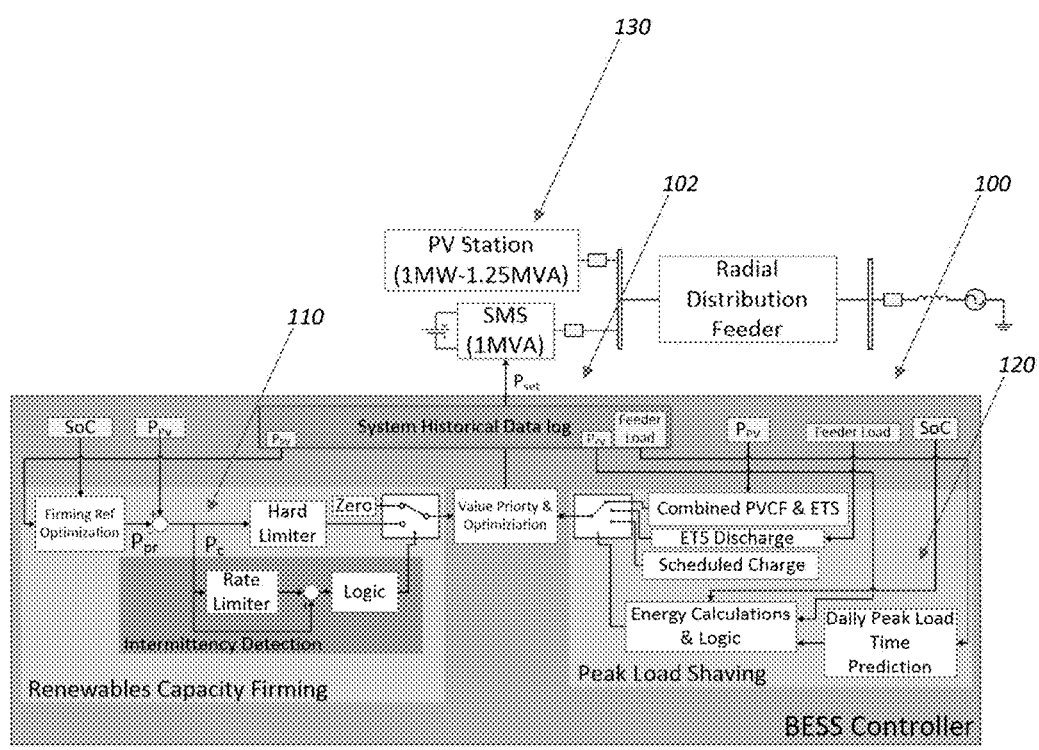
FIG. 13 is a block diagram illustrating BESS control for the PV station capacity firming and peak load shaving algorithms of the present disclosure.
Figure 14:
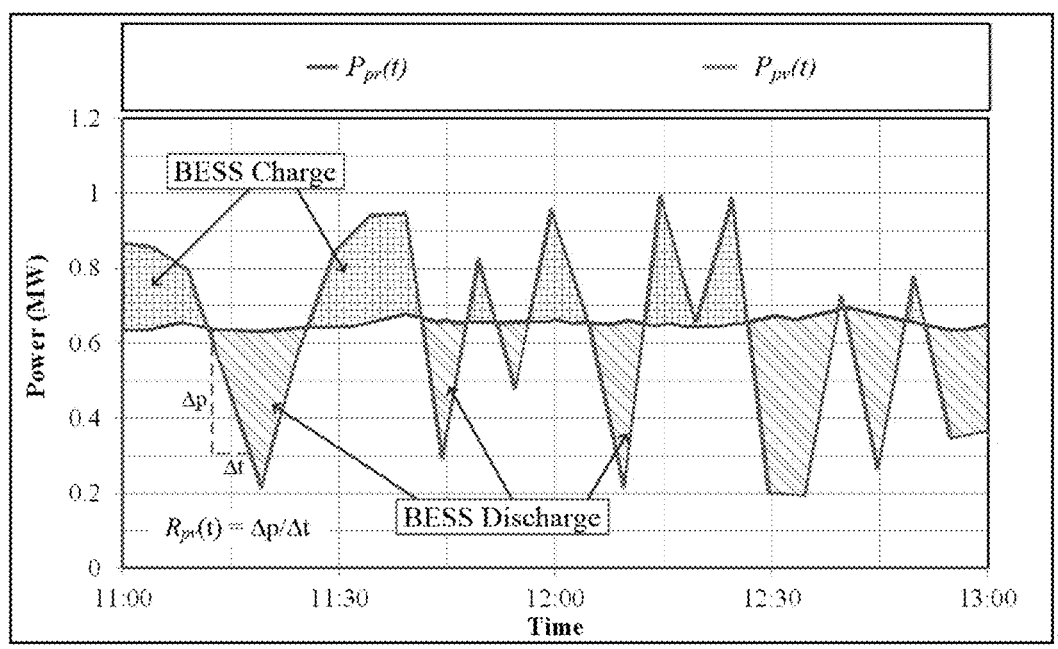
FIG. 14 is a plot illustrating BESS operation in response to output PV power and reference power values.
Figure 15:
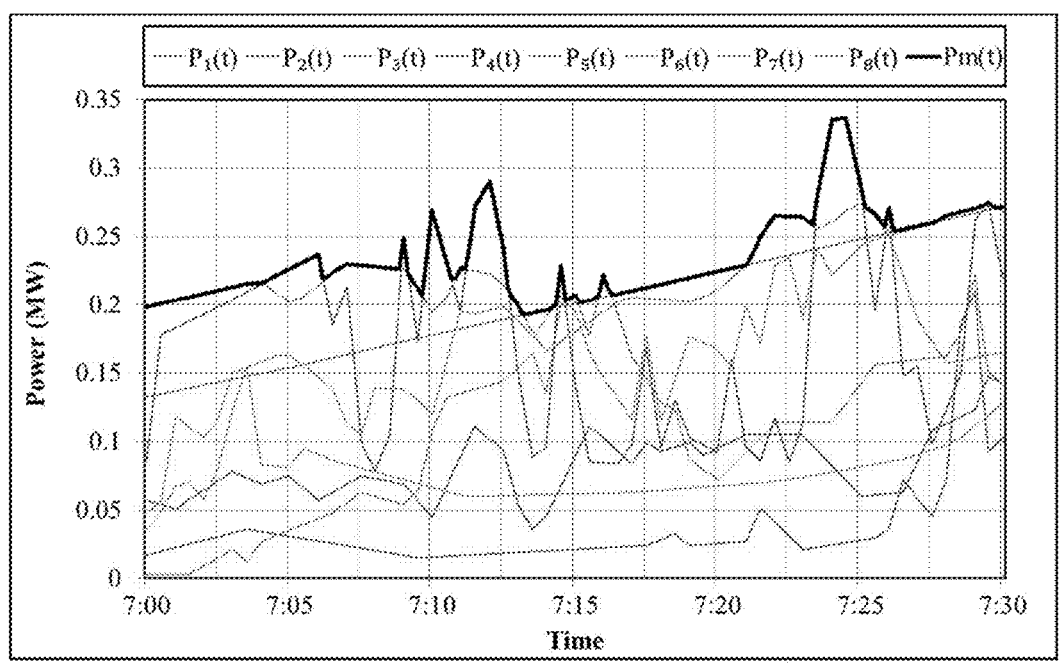
FIG. 15 is a plot illustrating a characteristic maximum PV curve.

Referring now specifically to FIG. 13, in another exemplary embodiment, the controller 100 of the present disclosure relies on gathering data streams from different points of the distribution feeder on which the BESS 100 is installed. The controller 100 subscribes to the different data streams and acquires data inputs needed for the BESS applications implemented. Both real time system data and recorded historical data 102 are used to calculate the required BESS active power reference ($P_{set}$(t)) and identify optimal firming degree. The description of the invention is presented here after by elaborating the RCF algorithm 110 first and secondly, the PLS algorithm 120, in the context of a PV station 130.

The BESS control algorithm for renewables capacity firming is described for a 1MW PV station. However, this algorithm can be applied for any sized PV station. PV station capacity firming (PVCF) aims to minimize PV station power swings. The described PVCF algorithm targets large power swings occurring at noon when PV output is at its peak. These swings are the most crucial to minimize transients in the feeder. A PV reference value is used to determine the optimal PV power output during power swings. This reference curve is deduced taking into account the PV station characteristics and BESS size. The PV capacity firming algorithm depends on a four stage adaptive filtering control (AFC) methodology. First, a characteristic PV curve is developed based on daily PV power output recorded from historical data. Second, a firming power reference is developed that considers real time PV station power swing magnitudes, battery capacity & targeted SoC at the end of the firming period. Third, an intermittency detection algorithm triggers the BESS to commence and halt firming based on PV station output ramp rate. The details of the algorithm are discussed next.

The PVCF algorithm utilizes short term historical PV station output to develop a characteristic maximum PV curve for the PV station location at that time of year. This curve is used to ultimately deduce an optimal power reference that is compared with instantaneous PV output power to determine the manner in which the BESS active power should be dispatched to attain firmed power at the point of common coupling. As shown in equation (14), the instantaneous value of the BESS active power reference ($P_{set}(t)$) is equal to the difference between the power reference and the real-time output power of the PV station.

$$P_{set}(t) = P_{pr}(t) - P_{pv}(t) \quad (14)$$

For a daily output power of PV station $P_{pv}^k(t)$ where k signifies the day number preceding the current day; k=1,2, 3,4, ... n, the characteristic maximum PV curve is given by:

$$P_m(t) = \max(P_{pv}^1(t), P_{pv}^2(t), P_{pv}^3(t) \ldots P_{pv}^n(t)) \quad (15)$$

The smoothed characteristic maximum power curve (SCMP) is defined as:

$$P_{scmp}(t) = a\, P_m(t) b(P_{scmp}(t-\Delta t) + R_m \Delta t) + C(P_{scmp}(t-\Delta t) + R_m \Delta t) \quad (16)$$

where a, b, and c are digits of a 3-bit binary number ($\Psi$), 'a' being the most significant bit and 'c' the least significant. Let us define $\lambda$, as:

$$\lambda(t) = \frac{P_m(t) - P_{scmp}(t-\Delta t)}{\Delta t} \quad (17)$$

$$\Psi(t) = \begin{cases} 100 & \text{for } -R_m < \lambda(t) < R_m \\ 010 & \text{for } \lambda(t) > R_m \\ 001 & \text{for } \lambda(t) < -R_m \end{cases} \quad (18)$$

where $R_m$ is defined as the maximum allowed rate of change of the smoothed characteristic maximum PV power with respect to time. $R_m$ is directly related to $R_n$ which is defined as the PV station's nominal characteristic rate of change of output active power. In other words, it can be described as the maximum rate of change of a PV station's output power with respect to time, in absence of clouds and any rapid power swings. The value of $R_n$ is directly related to the size of the PV station in question. Assuming a 1MW PV station, $P_m(t)$ is regressed to attain the sixth order polynomial shown below:

$$p(t) = 4.24 \times 10^{-13} t^6 - 8.98 \times 10^{-10} t^5 + 7.4 \times 10^{-7} t^4 - 3 \times 10^{-4} t^3 + 0.05 t^2 + 0.24 t + 15.31 \quad (19)$$

Figure 17:
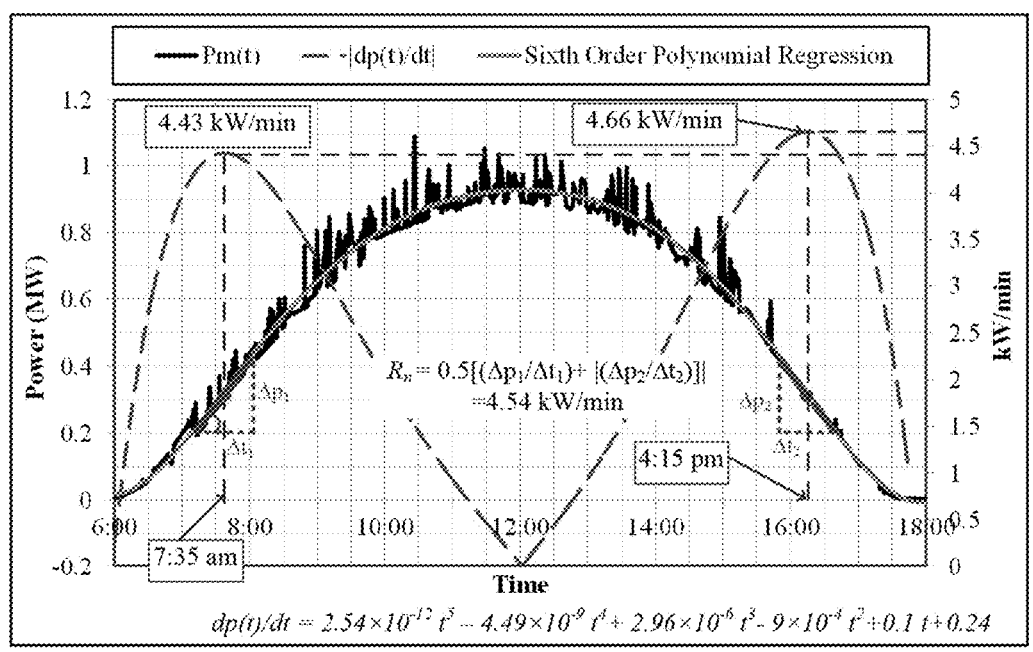
FIG. 17 is a plot of 1MW PV station sixth order polynomial rate of change and maximum ramp rate identification.

The attained polynomial is differentiated with respect to time to attain (dp(t)/dt) as shown in FIG. 17.

Since irradiance is approximately symmetrical across noon, single $R_n$ and $R_m$ values are defined for both increasing and decaying PV power output. Therefore, the maximum positive and negative rates of changes of the regressed 6$^{th}$ order polynomial are averaged to deduce $R_n$ for a 1MW station.

Figure 16:
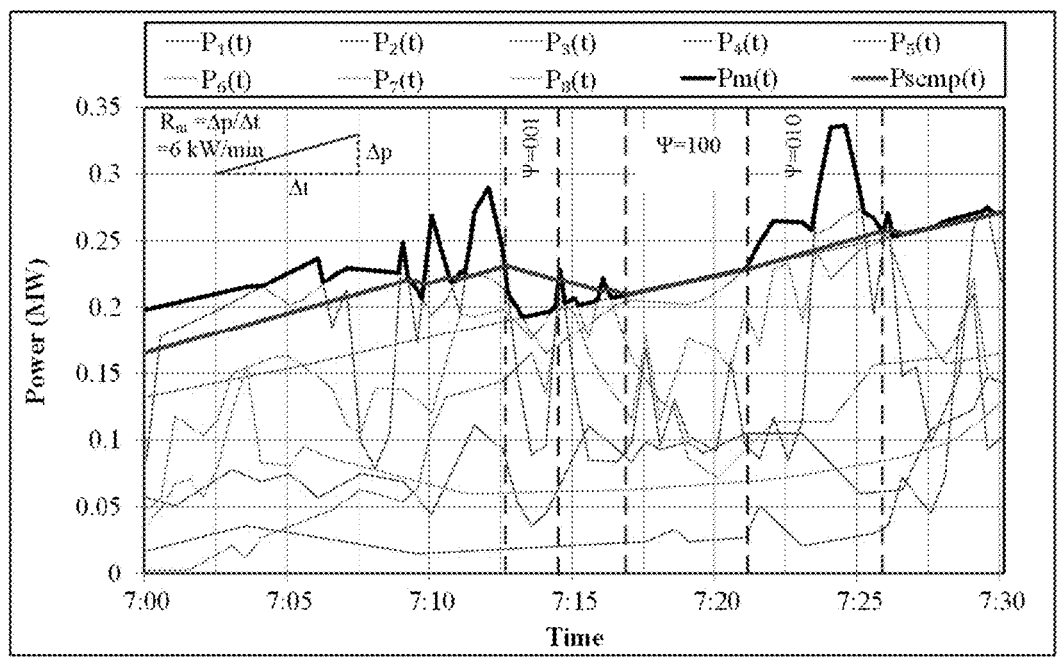
FIG. 16 is a plot illustrating a smoothed characteristic maximum PV power curve.

The value of $R_m$ is chosen to be 130% of $R_n$ to allow for curve settling after fluctuations of $P_m(t)$. FIG. 16 shows $P_{scmp}(t)$ after utilizing an $R_m$ value of 6 kW/min.

Figure 18:
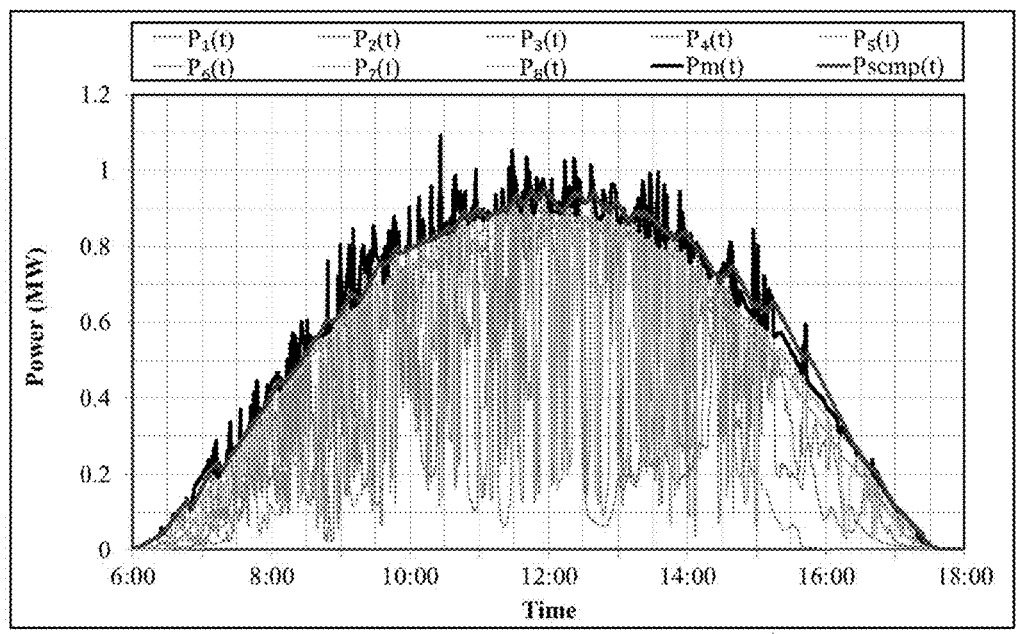
FIG. 18 is a plot illustrating a smoothed characteristic maximum PV curve for a 1MW PV station.

Applying equations (15) to (18) to the short term historical data recorded from a 1MW PV station, we attain the smoothed characteristic maximum PV curve shown in FIG. 18.

As discussed, the second stage is to develop a firming reference power considering the ramp rates and the battery state of charge. The firming reference ($P_{pr}(t)$) is a fraction of the SCMP curve. This can be written as:

$$P_{pr}(t) = m(t) \times P_{scmp}(t) \quad (20)$$

As noticed from the previous equations, the firming reference value determines the degree of attainable firming. Also, it dictates the extent to which the BESS intervenes. Since varying the weighting factor 'm' can be used to control the degree of firming and in turn, the battery state of charge (SoC) throughout the firming period, its value is used to maximize the SoC at the time of predicted feeder peak load and also maintain sufficient firming. This can be accomplished as follows.

For a certain time step ($\Delta t$):

$$\Delta SoC \times E_{cap} = (P_{pv}(t) - m_e(t) P_{scmp}(t)) \Delta t \quad (21)$$

where $E_{Bcap}$ is the battery energy capacity and $\Delta SoC$ is the change in state of charge. The weighting factor $m_e(t)$ is defined as:

$$m_e(t + \Delta t) = \frac{P_{pv}(t)}{P_{scmp}(t)} - \frac{E_{cap}}{P_{scmp}(t)} \frac{\Delta SoC}{\Delta t} : \left|\frac{dm_e(t)}{dt}\right| < r_m \quad (22)$$

$$\frac{\Delta SoC}{\Delta t} = \frac{SoC_T - SoC(t)}{T_T - t} \quad (23)$$

$$P_{pr}(t) = m_e(t) \times P_{scmp}(t): \left|\frac{dP_{pr}^{de}(t)}{dt}\right| < R_m \quad (24)$$

Figure 19:
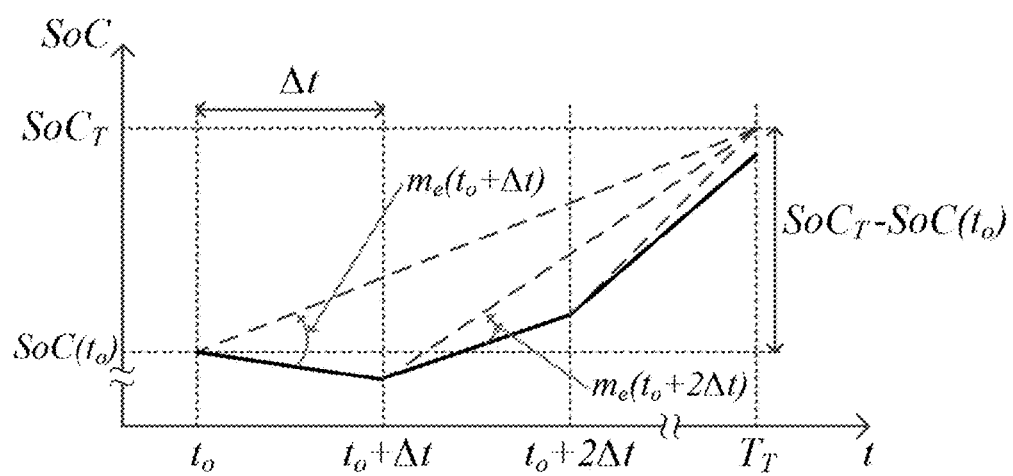
FIG. 19 is a plot illustrating $m_e$ calculation for energy oriented firming reference power.

As shown in equation (22), the value of $m_e(t)$ can be adjusted each time step ($\Delta t$) to allow battery SoC to reach a target value ($SoC_T$) at a target time ($T_T$). The manner in which the SoC approaches its target value is shown in FIG. 19. Not reaching the targeted SoC compromises the execution of further energy storage functions after PVCF. The weighing factor ramp limiter ($r_m$) is tuned to assess favorability of maximized firming against reaching SoC target.

Further, reaching the targeted SoC before the targeted time compromises firming performance. For our case, our target value is 95% SoC at a target time ($T_{est}$).

Figure 20:
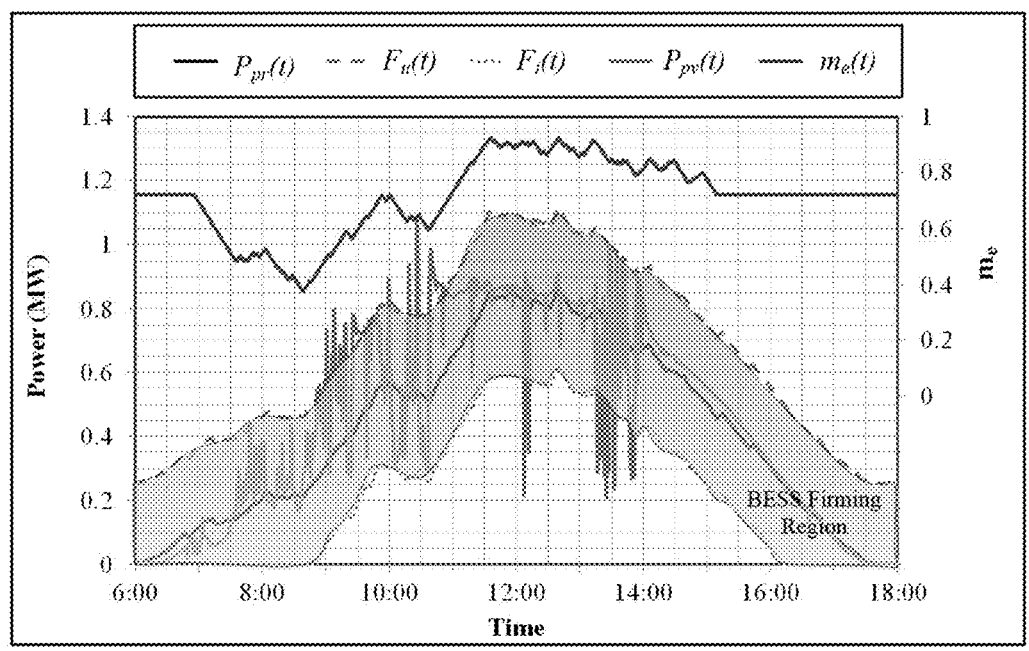
FIG. 20 is a plot illustrating firming reference variation with a weighting factor.

Considering the typical partially cloudy PV day shown in FIG. 20, the weighing factor $m_e(t)$ varies according to equation (22) to firm power intermittencies and simultaneously maximize BESS SoC at the end of the day. In turn, the firming reference varies which causes the BESS firming region to shift. The BESS firming region is defined as the region in which the BESS (in light of its capacity) is capable of firming any PV power swings.

Figure 21:
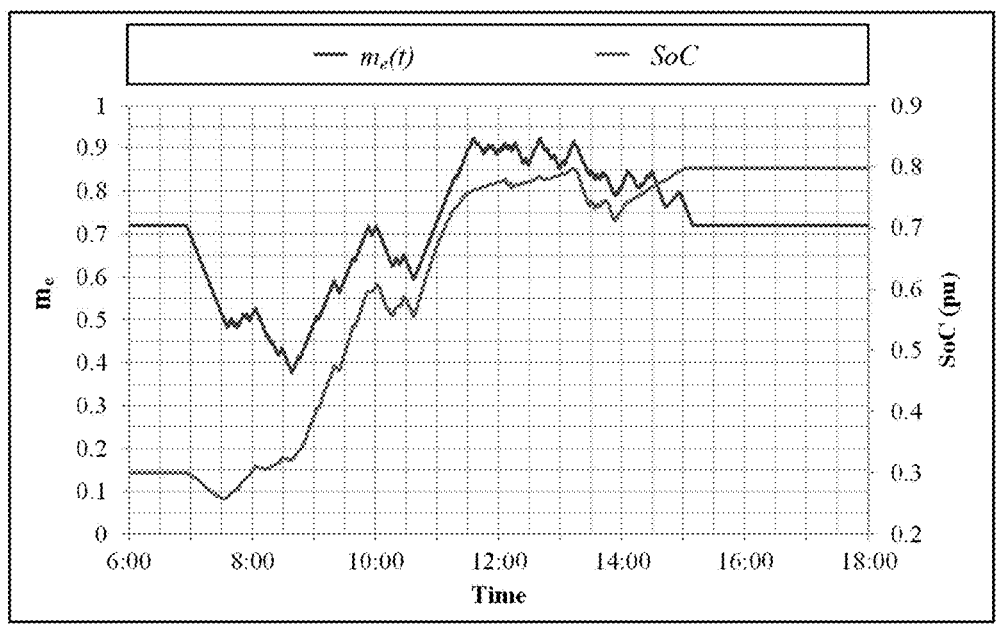
FIG. 21 is a plot illustrating a weighting factor $m_e(t)$ and SoC variation for a partly cloudy PV day.
Figure 22:
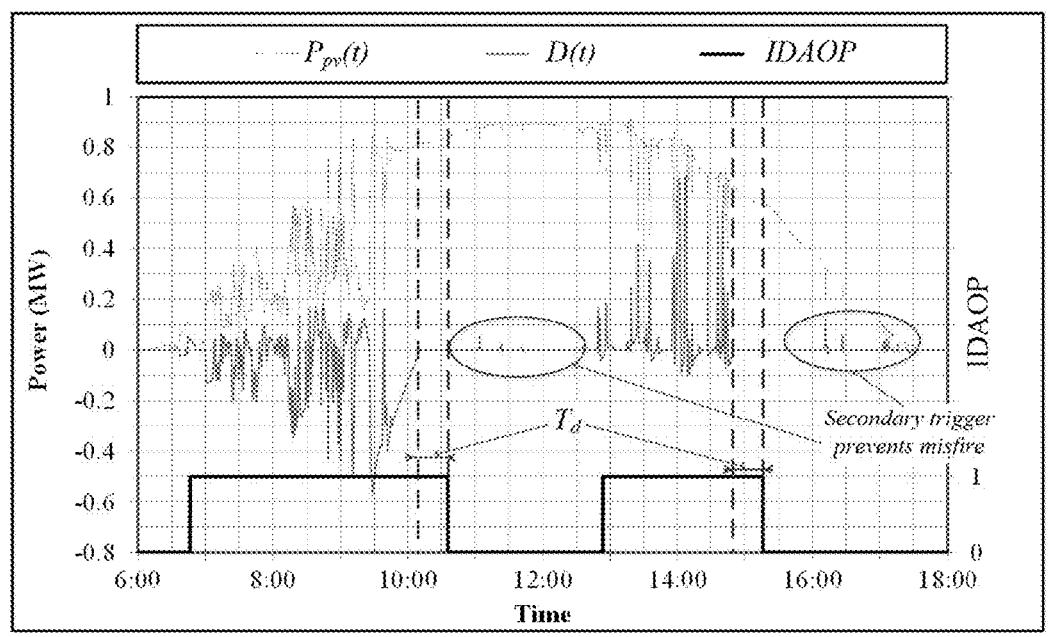
FIG. 22 is a plot illustrating IDA operation for a typical PV station output.

The increase of the BESS SoC from 15% to 80% is apparent in FIG. 21. Also, the firming region attained covers most of the PV power swings. This implies that efficient performance of PVCF is possible while setting battery SoC to a desired value at a desired time.

Intermittency detection allows the idling of the BESS during times when PV output power is naturally firmed and does not require conditioning. The Intermittency Detection Algorithm (IDA) contributes to conservation of battery life and decreases value degradation.

The intermittency detection algorithm relies on constantly tracking the rate of change of the difference $P_c(t)$ between the output PV power and the power reference curve. $P_{cf}(t)$ is equal to $P_c(t)$ such that the first derivative with respect to time of $P_c(t)$ is limited to a certain value ($R_{sw}$). Equation (26) defines this relation. $P_c(t)$ is then subtracted from ($P_c(t)$) to obtain (D). If the value of D violates a certain threshold, PV power swings are identified and firming is commenced. Firming continues till value of D is maintained within limits for a period $T_d$.

$$P_c(t) = P_{pv}(t) - P_{pr}(t) \quad (25)$$

$$P_{cf}(t) = \begin{cases} P_c(t) & \text{for } -R_{sw} < \frac{P_c(t) - P_{cf}(t-\Delta t)}{\Delta t} < R_{sw} \\ R_{sw}\Delta t + P_{cf}(t-\Delta t) & \text{for } \frac{P_c(t) - P_{cf}(t-\Delta t)}{\Delta t} > R_{sw} \\ R_{sw}\Delta t + P_{cf}(t-\Delta t) & \text{for } \frac{P_c(t) - P_{cf}(t-\Delta t)}{\Delta t} < -R_{sw} \end{cases} \quad (26)$$

$$D(t) = P_c(t) - P_{cf}(t) \quad (27)$$

Figure 23:
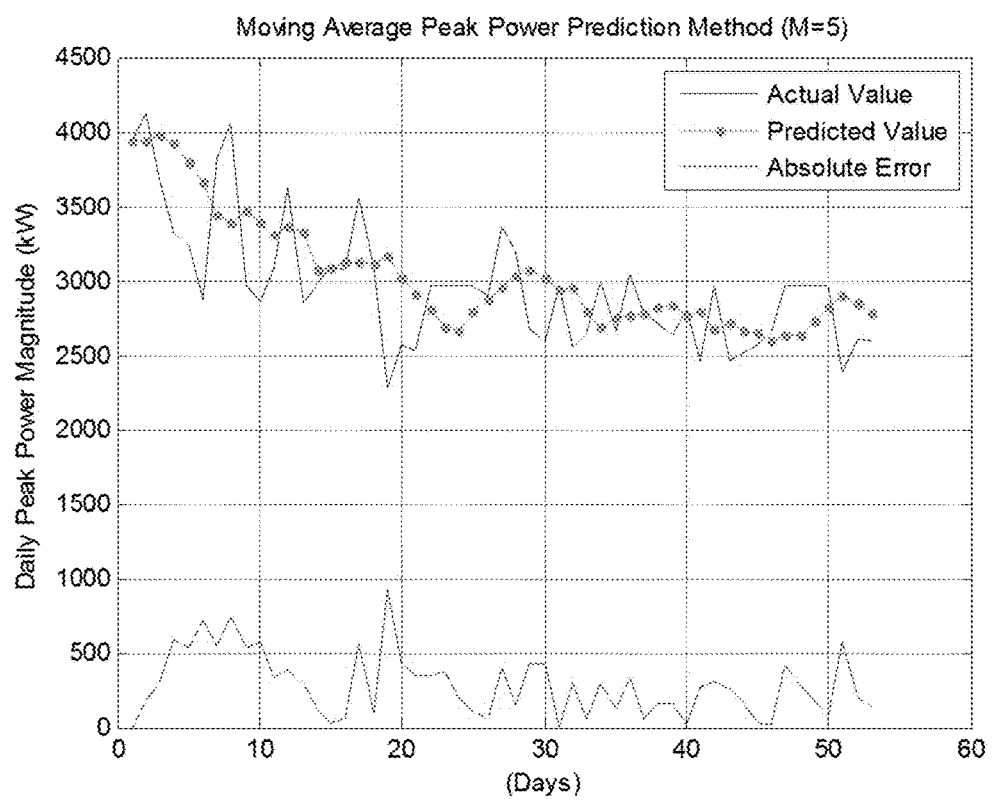
FIG. 23 is a plot illustrating daily peak load magnitude prediction using a moving average method.

An important trait of the discussed IDA is the application of dual triggers to prevent premature setting of the intermittency detection algorithm output (IDAOP) which would cause unwanted BESS operation. The first threshold violation of D(t) is ignored and used only to set the value of a SR flip-flop that in turn, sets the IDAOP provided that a secondary SR flip-flop is also set by a secondary threshold violation of D(t). FIG. 23 shows the operation of the IDA for a sample day. It can be noticed that the algorithm is triggered only during the times of intermittent PV station output or in other words, during high scale power swings. It is also clear that the algorithm output is rested after the PV station output maintains a non-intermittent output state for the specified time period $T_d$.

The ETS algorithm designed here after aims to achieve the electricity market equivalent of financial arbitrage, a term widely used by utilities and storage system operators for ETS applications. The financial definition of arbitrage is the simultaneous purchase and sale of identical commodities across two or more markets in order to benefit from a discrepancy in their price relationship. In order to efficiently achieve this, the precise prediction of peak load magnitude and time is crucial. Studying the long time interval load curves, it was found that applying a moving average prediction scheme with variable intervals provides accurate prediction. Relying on this, the algorithm checks the battery state of charge (SoC) and calculates the time of day to commence battery discharge such that the predicted load curve maximum time lies in the middle of the discharge time period.

$$P_{est}(n+1) = \frac{\sum_{k=n-M+1}^{n} P_k(t)}{M} \quad (28)$$

where n represents the current day and M is the moving average interval.

$$T_{est}(n+1) = \frac{\sum_{k=n-M+1}^{n} T_k(t)}{M} \quad (29)$$

$P_k(t)$ and $T_k(t)$ are the magnitude and time of daily peak loads for the $k^{th}$ day, respectively.

$$T_{Dstart} = T_{Lpeak} - \frac{(SoC) \times E_{Cap}}{2 \times P_D} \quad (30)$$

Figure 24:
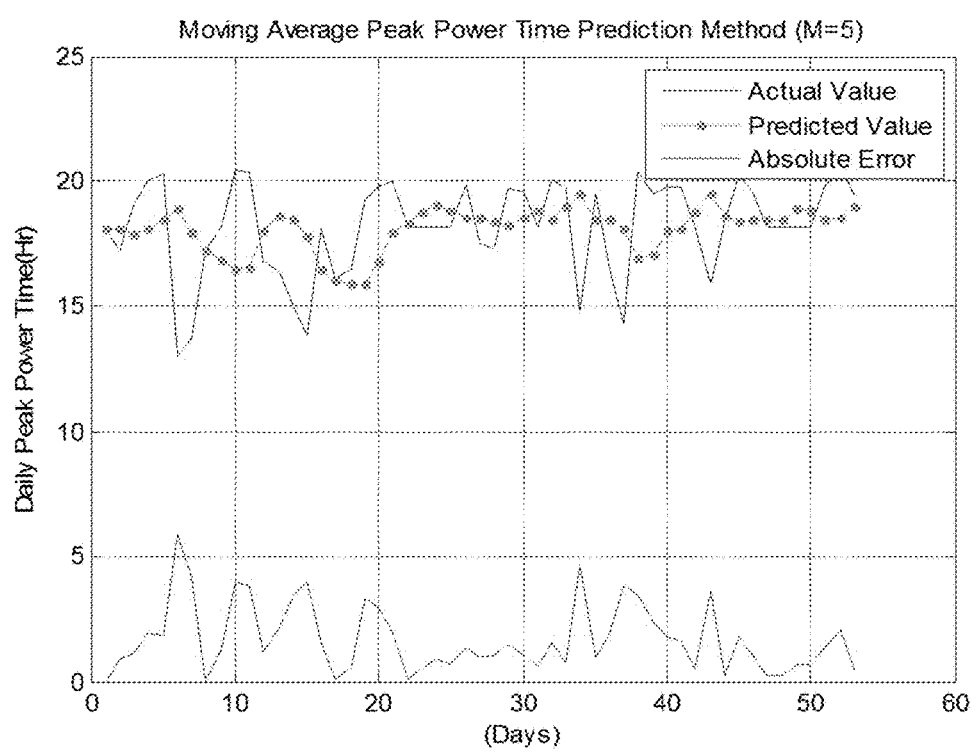
FIG. 24 is another plot illustrating daily peak load magnitude prediction using a moving average method.

Given a sample sixty day load curve data, daily peak load magnitudes and times are determined and shown in FIGS. 23 and 24. Equations (28) and (29) are applied with an arbitrary moving average interval M=5. The error between actual and predicted peak load values in FIGS. 23 and 24 are recorded for all days and averaged for varying the moving average period from M=1 to M=60 in FIG. 25.

Figure 25:
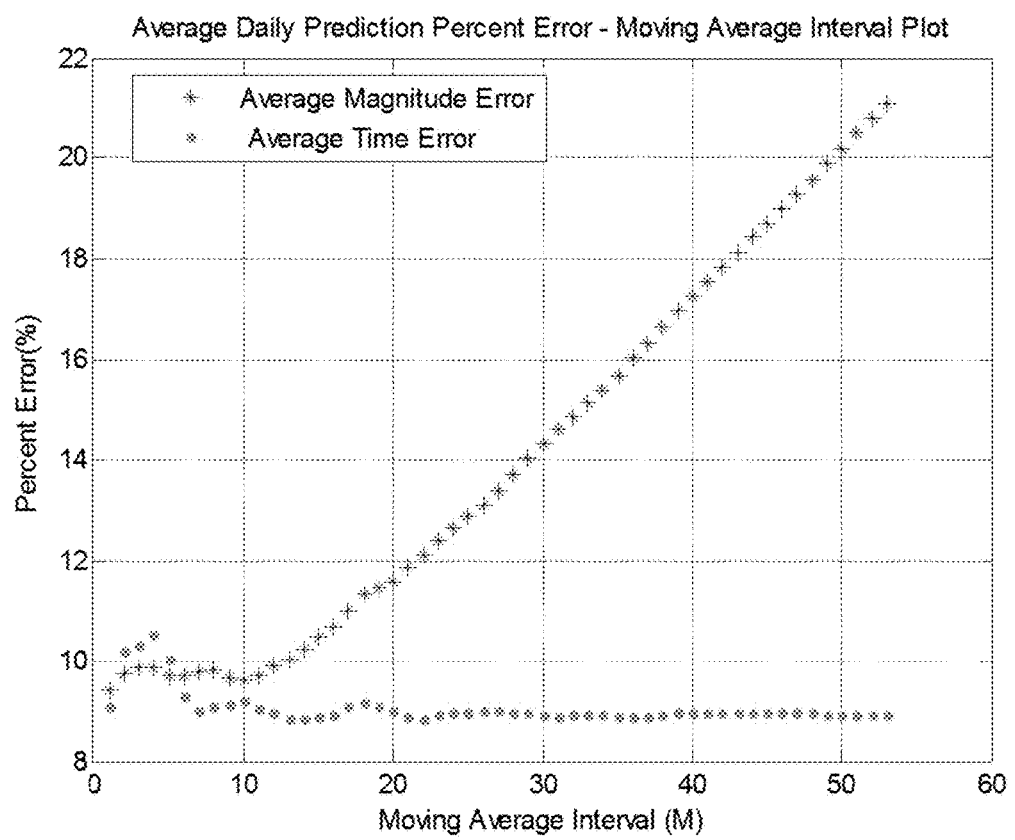
FIG. 25 is a plot illustrating moving average prediction method percent errors.

As shown in FIG. 25, utilizing a moving average interval less than 10 for peak load magnitude prediction offers less than a 10% error, whereas utilizing a moving average interval greater than 6 for peak load time prediction offers an error less than 7%.

Assuming a 750 kWh battery is fully charged and will perform smoothing at maximum battery capacity (250 kW), the total time of discharge is 3 hours. This covers the average prediction error calculated. Also, since load curves of most days show minimal load at 4:30 am, the ETS algorithm is set to start charging the battery at 3 am to avoid the local maximum that occurs at 7:00 am.

Again, in various exemplary embodiments, the present disclosure further provides a low cost PV station capacity firming (PVCF) algorithm utilizing BESSs. The electronic process relies on two main stages. The first stage involves the analysis of historical PV station output and logged cloud state data for the purpose of identifying optimal algorithm parameters for each predetermined day type. Twenty-seven day types are classified according to cloud state patterns, for example. The second stage involves the utilization of web-based cloud state predictions to recognize day-ahead weather conditions and identify cloud state patterns. Optimal pre-calculated algorithm values, specific to identified cloud patterns, including starting state-of-charge (SoC) and firming reference ramp rate limits, are applied for firming maximization. Algorithm simulation and implementation results are presented and discussed. Thus, the present disclosure provides an optimal state of charge and a firm reference weighting factor.

The BESS control algorithm for renewables capacity firming targets large power swings occurring at noon when PV output is at its peak. These swings are the most crucial to minimize transients in the feeder. A PV reference value is used to determine the optimal PV power output during power swings. First this reference curve is deduced taking into account the PV station characteristics and BESS size. The PV capacity firming algorithm depends on a four stage adaptive filtering control (AFC) methodology. First, a characteristic PV curve is developed based on daily PV power output recorded from historical data. Second, a firming power reference is developed that considers real time PV station power swing magnitudes, battery capacity, and targeted SoC at the end of the firming period. Third, an intermittency detection algorithm triggers the BESS to commence and halt firming based on PV station output ramp rate. The details of the algorithm are discussed next.

The PVCF algorithm utilizes short term historical PV station output to develop a characteristic maximum PV curve for the PV station location at that time of year. This curve is used to ultimately deduce an optimal power reference which is compared with instantaneous PV output power to determine the manner in which the BESS active power should be dispatched to attain firmed power at the point of common coupling. The derivation of this curve is represented in our earlier patent. It can be represented as:

$$P_{scmp}(t) = a\, P_m(t) + b(P_{scmp}(t-\Delta t) + R_m \Delta t) + C(P_{scmp}(t-\Delta t) + R_m \Delta t) \quad (21)$$

where a, b, and c are digits of a 3-bit binary number ($\Psi$), 'a' being the most significant bit and 'c', the least significant. Let us define $\lambda$, as:

$$\lambda(t) = \frac{P_m(t) - P_{scmp}(t-\Delta t)}{\Delta t} \quad (32)$$

$$\Psi(t) = \begin{cases} 100 & \text{for } -R_m < \lambda(t) < R_m \\ 010 & \text{for } \lambda(t) > R_m \\ 001 & \text{for } \lambda(t) < -R_m \end{cases} \quad (33)$$

where $R_m$ is defined as the maximum allowed rate of change of the smoothed characteristic maximum PV power with respect to time. $R_m$ is directly related to $R_n$ which is defined as the PV station's nominal characteristic rate of change of output active power. In other words, it can be described as the maximum rate of change of a PV station's output power with respect to time, in the absence of clouds and any rapid power swings. The value of $R_n$ is directly related to the size of the PV station in question.

As discussed, the second stage is to develop a firming reference power considering the ramp rates and the battery state of charge. The firming reference ($P_{pr}(t)$) is a fraction of the SCMP curve. This can be written as:

$$P_{pr} m(t) \times P_{scmp}(t) \quad (34)$$

As noticed from the previous equations, the firming reference value determines the degree of attainable firming. Also, it dictates the extent to which the BESS intervenes. Since varying the weighting factor can be used to control the degree of firming and in turn, the battery state of charge (SoC) throughout the firming period, its value is used to maximize the SoC at the time of predicted feeder peak load and also maintain sufficient firming.

Intermittency detection allows the idling of the BESS during times when PV output power is naturally firmed and does not require conditioning. The intermittency detection algorithm (IDA) contributes to conservation of battery life and decreases value degradation.

Given the stochastic nature of PV station intermittencies, it is required to implement a dynamic programming optimization routine to determine optimal algorithm parameters to satisfy maximum firming. The optimization technique implemented here relies on the utilization of publicly available hourly weather forecasts for PV station location. Two main algorithm parameters are to be optimized, viz., initial BESS SoC (SoC$_{st}$), and the limit applied for the first time derivative of the firming reference weighing factor ($m_d(t)$). This is the constant expressed below and namely, $m^{\bullet}_{dCap}$. The following minimization function is to be considered:

$$\min A_t = \int_{t_s}^{t_e}[P_{pv}(t) - P_{pr}(t) - PB\max]dt + tste[Pprt - PB\max - Ppv\, t]dt$$

$$\forall P_{pv}(t) > P_{opr}(t) + P_{Bmax}, P_{opr}(t) - P_{Bmax} > P_{pv}(t)\, \&\, IDAOP(t) = 1$$

where $t_s$ and $t_e$ represent the time of start and end of PV station output, respectively. IDAOP(t) represents the instantaneous value of the intermittency detection algorithm output. J is the minimization function which represents the total unfirmed energy during a particular day. The constraints are:

$$0.1 < SoC_{st} < 0.95 \quad (35)$$

$$10^{-5} < m^{\bullet}_{dCap} < 10^{-3} \quad (36)$$

As expressed, the minimization function applied here is the summation of unfirmed energy over the full day duration. Further, presented previously, unfirmed energy is the time integrated power differential between PV power and either the upper ($F_u$) or lower ($F_l$) firming limits dictated by the current value of reference power $P_{pr}(t)$. This is the energy of the PV power swings that the BESS failed to firm due to its power or energy capacity. Therefore, the daily unfirmed energy could be regarded as a function of the BESS' current SoC and the instantaneous value of the reference power $P_{pr}(t)$ which dictates the location of the BFR in reference to instantaneous PV output.

Figure 26:
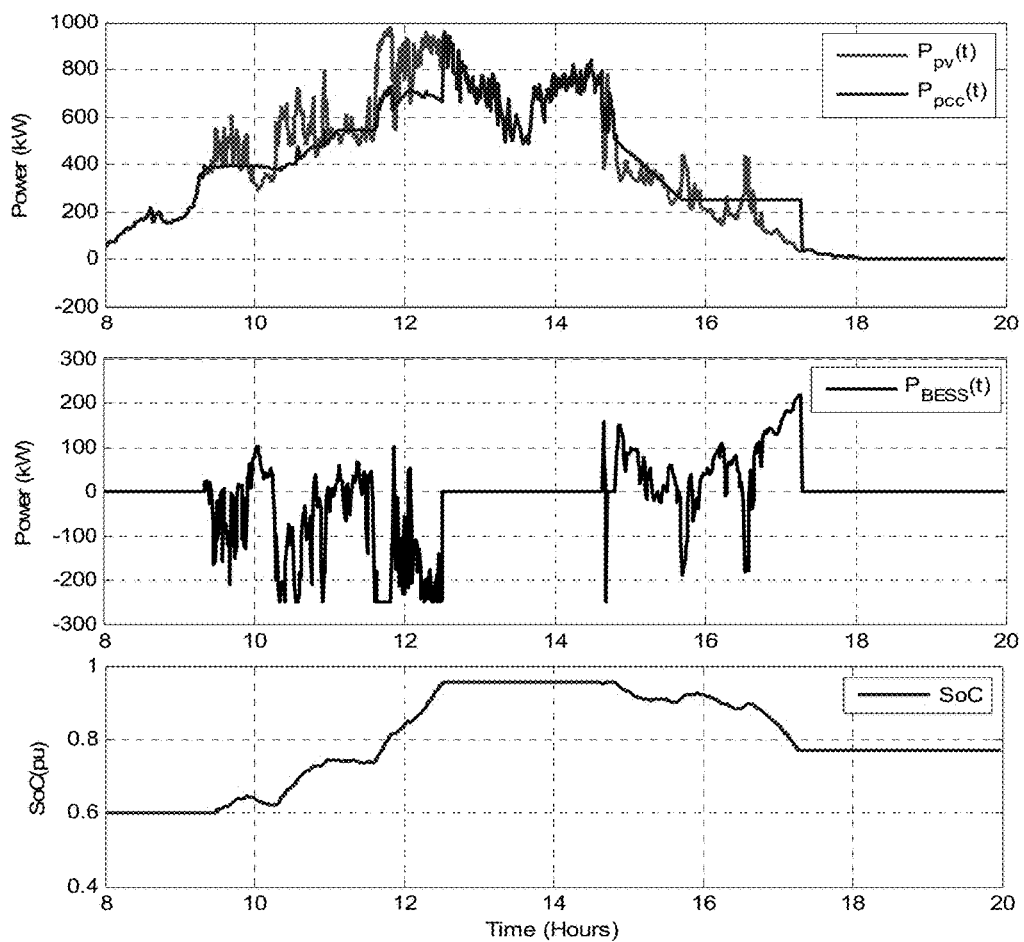
FIG. 26 is a plot illustrating a PVCF algorithm simulation result for sample day with arbitrarily chosen values for $SoC_{st}$ and $m^{\bullet}_{dCap}$.

The PV capacity firming algorithm discussed above expresses an apparent correlation between the degree of firming and two main algorithm parameters, namely, SoC$_{st}$ and $m^{\bullet}_{dCap}$. For instance, the simulation in FIG. 26 clearly shows an unfirmed PV output for a time interval spanning from 12:30 pm to 2:40 pm. This occurred due to the incapacity of the BESS to charge at that particular instant, due to the SoC reaching 95% (the maximum practically allowed SoC). This, in turn, resulted in the upper firming limit coinciding with the reference power ($P_{pr}(t)$) during the mentioned time interval which (by the description explained earlier) caused the upper firming limit's unfirmed energy ($A_u$) to reach 400 kWh as shown in FIG. 26.

Figure 27:
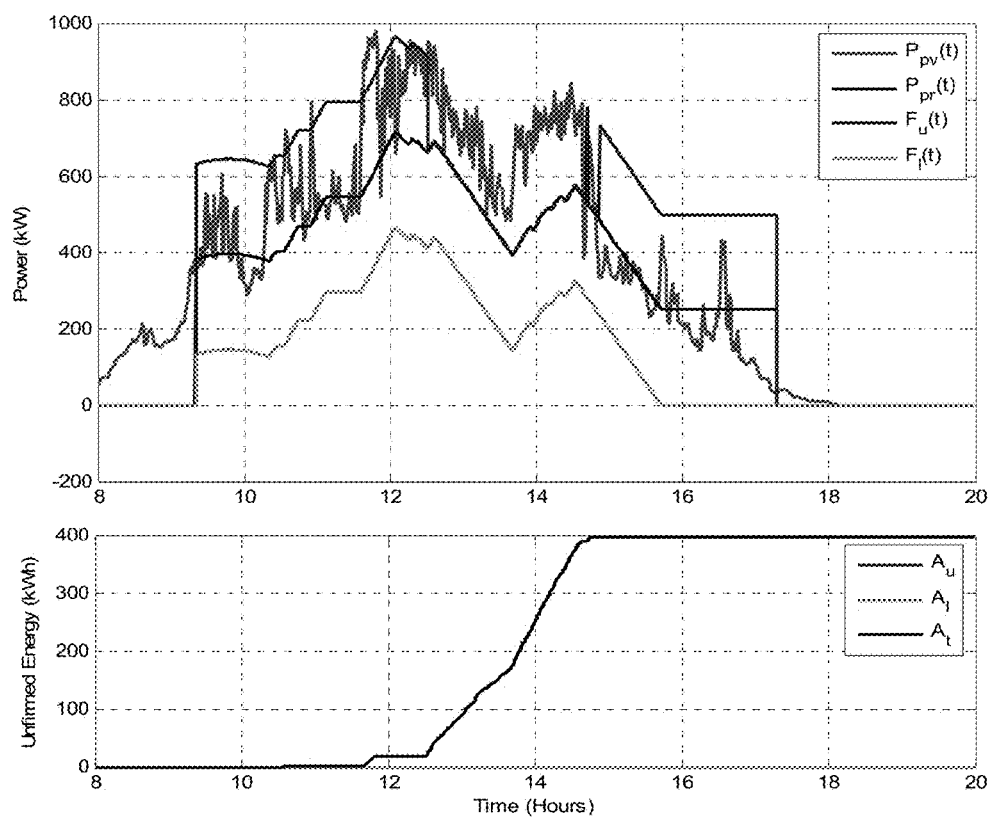
FIG. 27 is a plot illustrating upper and lower firming limits for a deduced algorithm reference power and the resulting unfirmed energy.

It is therefore sought to identify the values of the optimizable parameters (SoC$_{st}$ & $m^{\bullet}_{dCap}$) that would minimize the total unfirmed energy expressed in the minimization function. In FIG. 27, this is referred to as $A_t$, which is the summation of the upper and lower firming limits' unfirmed energy ($A_u$ & $A_l$).

Figure 28:
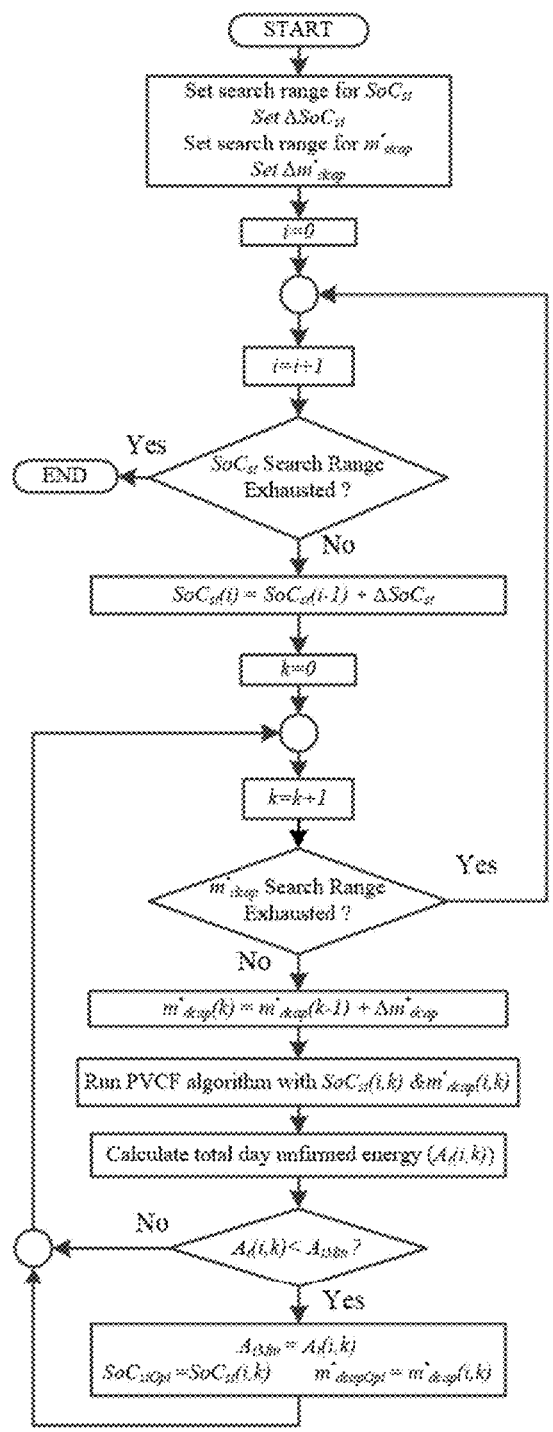
FIG. 28 is a flowchart illustrating dynamic programing optimization to identify optimal PVCF algorithm parameter values for a single day.

Maximum firming for a single day with known PV power output is achieved here through an offline dynamic programming optimization routine in which the chosen search range for each of the optimization parameters is fully exhausted in their application to the designed PVCF algorithm. This allows the identification of the optimal SoC$_{st}$ & $m^{\bullet}_{dCap}$ values, in addition to the minimum possible unfirmed energy for the day in question. As shown in the flow chart presented in FIG. 28, the search range and step values are initially specified for both SoC$_{st}$ & $m^{\bullet}_{dCap}$. As dictated by the nested loop expressed in the flow chart, all the values of the "$m^{\bullet}_{dCap}$" search range are applied with each new value of the "SoC$_{st}$" search range to the PVCF algorithm, to, in turn, identify the total unfirmed energy and, consequently, opt to update the values of SoC$_{stOpt}$ & $m^{\bullet}_{dCapOpt}$ or not, based on the value of $A_t(i,k)$ being a local minimum or not.

Figure 29:
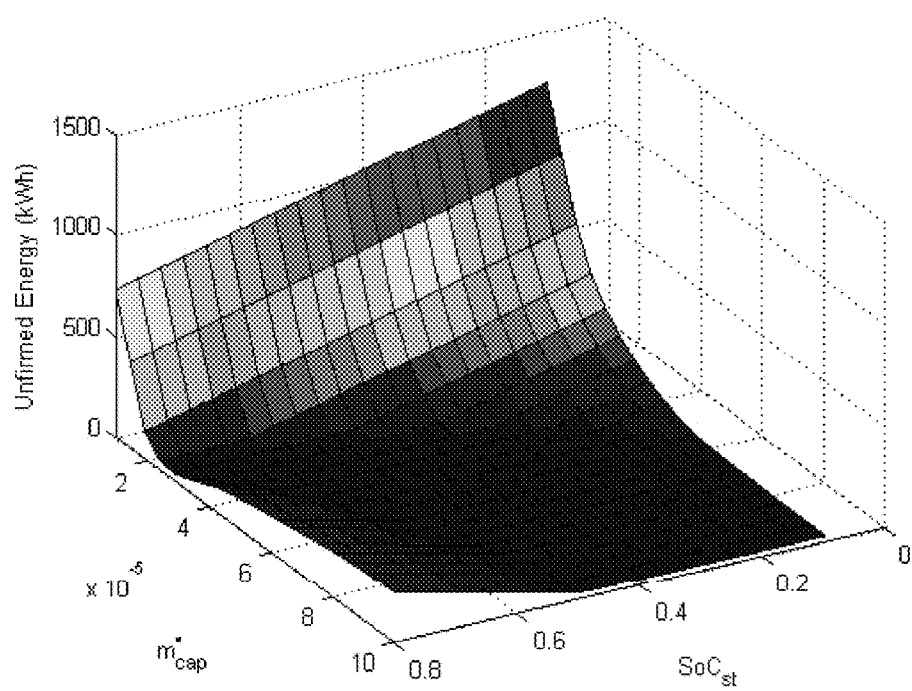
FIG. 29 is a surface plot illustrating unfirmed energy ($A_t$) plotted versus full search ranges of $SoC_{st}$ and $m^{\bullet}_{dCap}$.
Figure 30:
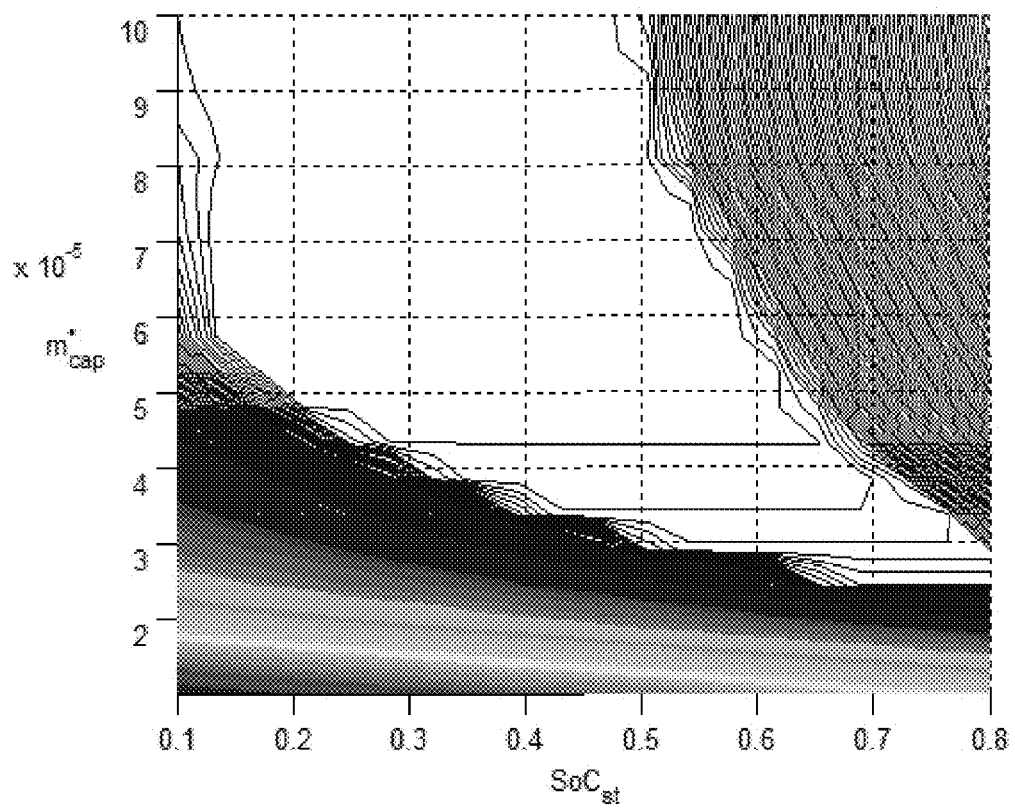
FIG. 30 is a contour plot illustrating optimal values for $SoC_{st}$ and $m^{\bullet}_{dCap}$ satisfying maximum firming.

The described dynamic programming routine is applied to the sample day presented. The results are expressed in FIG. 29, through graphing the subsequent points, given by SoC$_{st}$(i,k), $m^{\bullet}_{dCap}(1,k)$ and $A_t(i,k)$. The minimum value for unfirmed energy is found to be $A_{tMin} = 26$ kWh with a range of optimal values for both optimization parameters (SoC$_{st}$ & $M^{\bullet}_{dCap}$). This range is prescribed by the contour shown in FIG. 30. The optimal values are chosen to be in the median of the minimum energy contour shown. This value is found to be at SoC$_{st} = 33.9\%$ & $m^{\bullet}_{dCap} = 6.68 \times 10^{-5}$.

Figure 31:
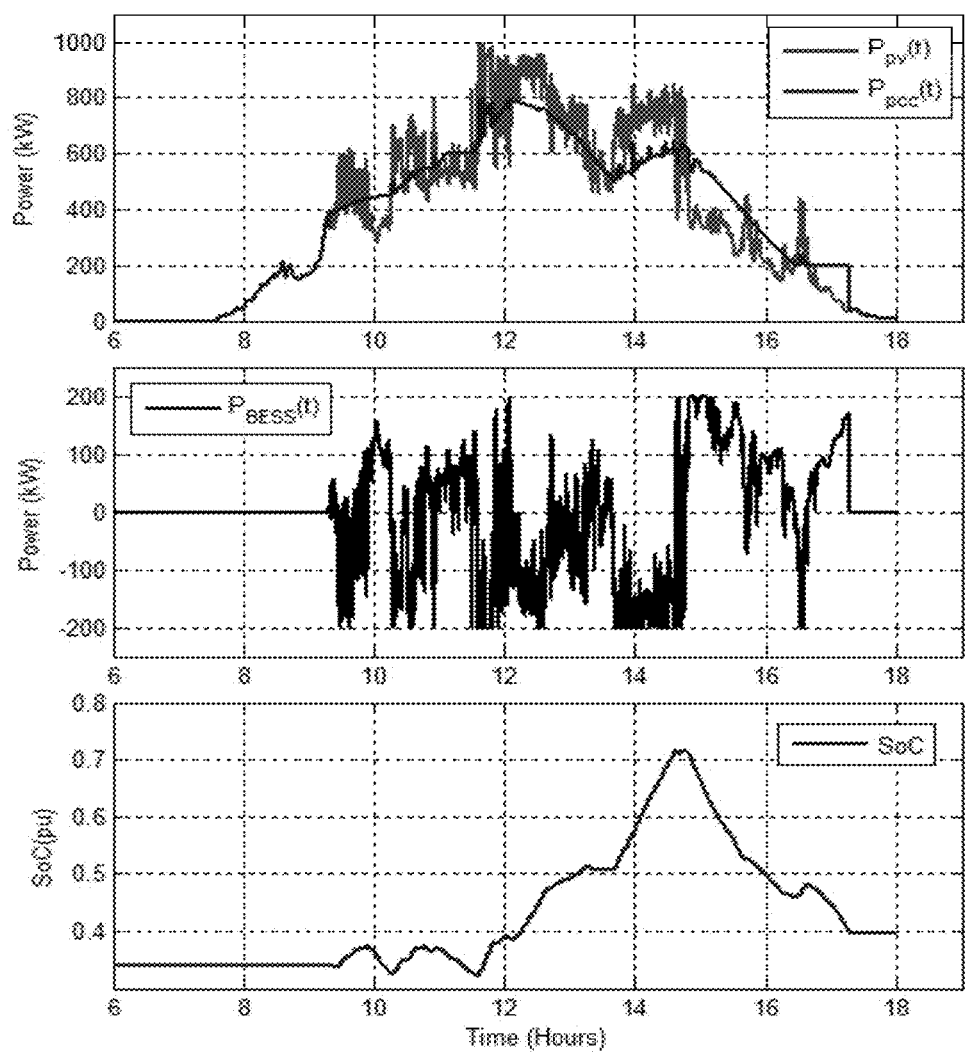
FIG. 31 is a series of plots illustrating firming results for a sample day utilizing optimal algorithm parameters.

Plugging the deduced optimal values for $SoC_{st}$ & $m^\bullet_{dCap}$ into the PVCF algorithm and running the simulation gives the results shown in FIG. 31. Comparison between firming results exhibited when utilizing averaged versus optimal parameter values reveals an apparent discrepancy when analyzing. The firming gap experienced when utilizing averaged values seizes to exist when adopting optimal values. Further, the battery SoC eludes reaching its upper and lower limits throughout the firming period. Also, most of PV power output lies within BFR.

In the pursuit to design a full PVCF algorithm that ensures maximum daily firming, it is sought to utilize optimal values that were deduced offline for future days with similar PV output characteristics. The similarity between optimal values of the mentioned parameters for different days of similar PV output suggests a considerable degree of effectiveness. This leads to the presumption that the cloud state of a particular day could be a factor that dictates the value of the optimization parameters and thus allow the application of the concluded optimal values for days of similar cloud states. The framework would be as follows, first, a number of day types are defined based on their cloud cover characteristics. Second, a criteria is built to identify each defined day type. Third, the optimization routine discussed is ran for mass historical data while identifying and recording day types and corresponding optimal values. Fourth, weather forecasts are utilized to identify next day cloud state and identify pattern and day type, to, in turn, adopt optimal values calculated offline for the identified day type.

Figure 32:
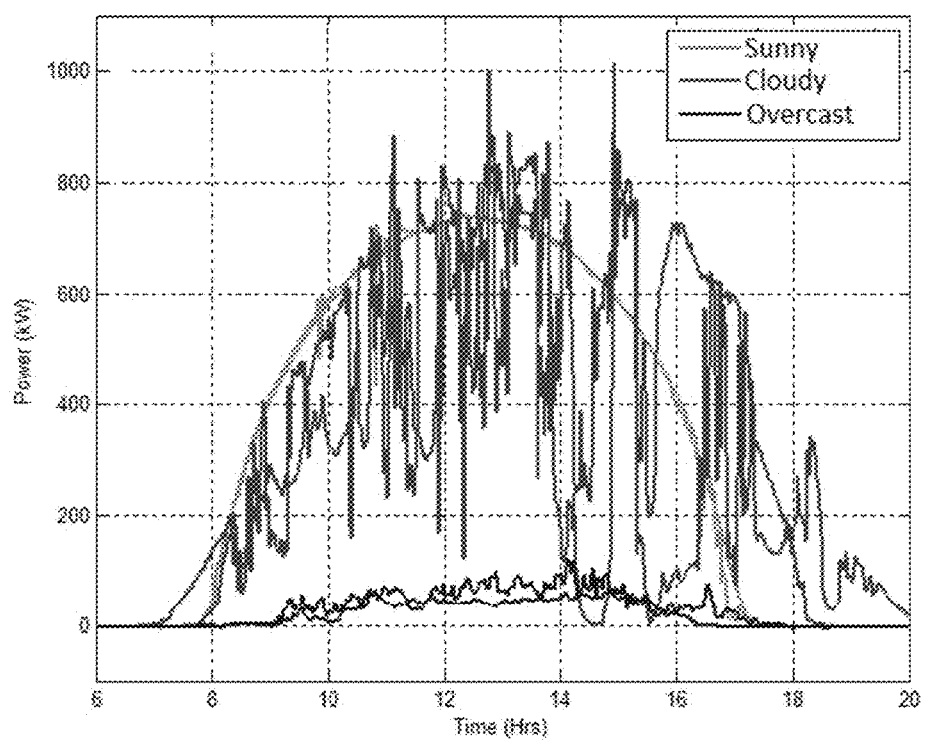
FIG. 32 is a plot illustrating PV power output for two days for clear, partially cloudy, and overcast cloud states.

Cross-referencing between several years of the practical PV power output and corresponding recorded cloud states for the described PV station, a strong correlation between PV output and hourly cloud state is concluded. Further, an apparent discrepancy in PV power output between days with sunny, cloudy, and overcast cloud states is shown in FIG. 32. However, in order to accurately describe a day in terms of its cloud state, it is necessary to define intervals within a single day. Since most days exhibit more than one cloud state, each day here is divided into three main periods (morning, noon, and evening). Each of these periods can be described in terms of its cloud state as sunny, cloudy, or overcast. This yields twenty-seven combinations, as shown in Table I.

TABLE I

Days types based on clouds states

| Type | Morning | Noon | Evening |
| --- | --- | --- | --- |
| 1 | Sunny | Sunny | Sunny |
| 2 | Sunny | Sunny | Cloudy |
| 3 | Sunny | Sunny | Overcast |
| 4 | Sunny | Cloudy | Sunny |
| 5 | Sunny | Cloudy | Cloudy |
| 6 | Sunny | Cloudy | Overcast |
| 7 | Sunny | Overcast | Sunny |
| 8 | Sunny | Overcast | Cloudy |
| 9 | Sunny | Overcast | Overcast |
| 10 | Cloudy | Sunny | Sunny |
| 11 | Cloudy | Sunny | Cloudy |
| 12 | Cloudy | Sunny | Overcast |
| 13 | Cloudy | Cloudy | Sunny |
| 14 | Cloudy | Cloudy | Cloudy |
| 15 | Cloudy | Cloudy | Overcast |
| 16 | Cloudy | Overcast | Sunny |
| 17 | Cloudy | Overcast | Cloudy |
| 18 | Cloudy | Overcast | Overcast |
| 19 | Overcast | Sunny | Sunny |
| 20 | Overcast | Sunny | Cloudy |
| 21 | Overcast | Sunny | Overcast |
| 22 | Overcast | Cloudy | Sunny |
| 23 | Overcast | Cloudy | Cloudy |
| 24 | Overcast | Cloudy | Overcast |
| 25 | Overcast | Overcast | Sunny |
| 26 | Overcast | Overcast | Cloudy |
| 27 | Overcast | Overcast | Overcast |

In order to correctly classify the optimal values for each day type, a certain criteria must be adopted to identify each day type when analyzing historical PV data. Therefore, each period within a certain day is sought to be identified. The adopted criteria will rely mainly on two parameters to identify periodical cloud states, namely, period energy (PE) and period Euclidean norm (PUN).

Figure 33:
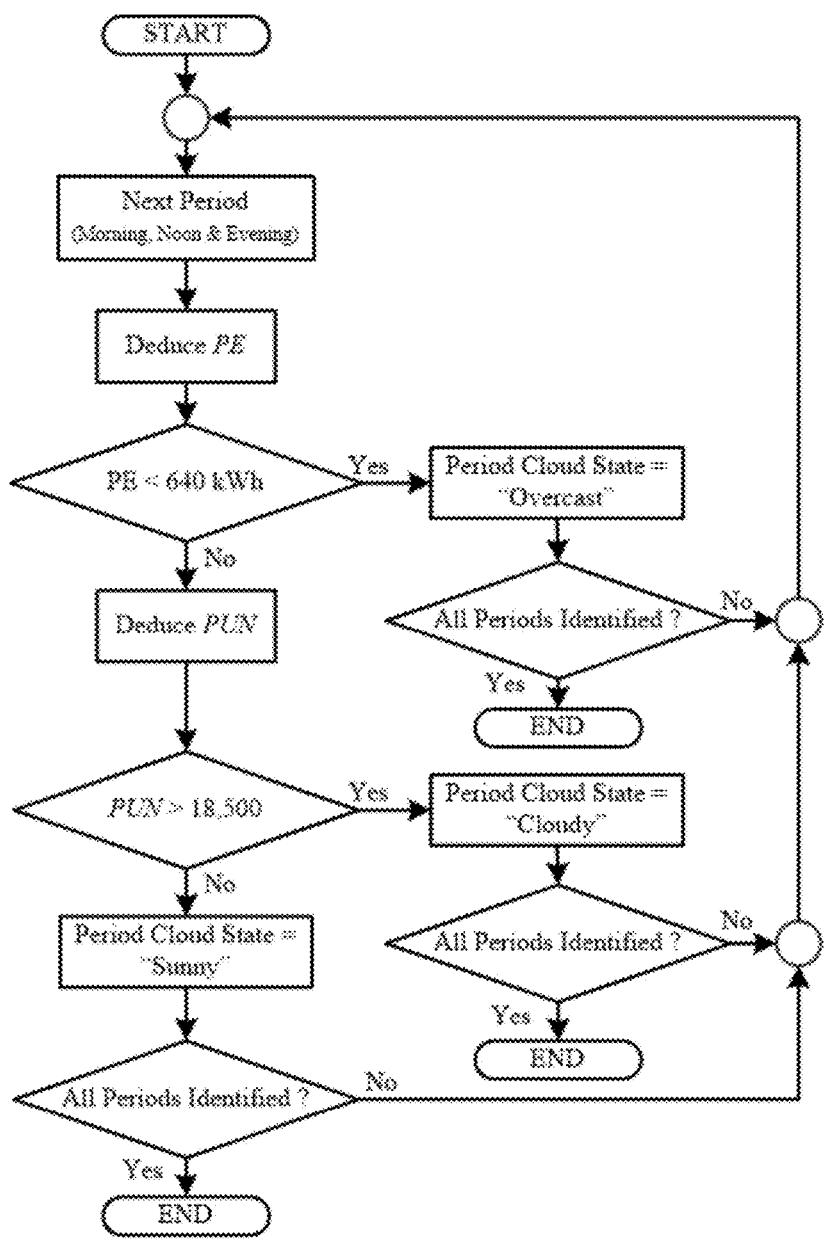
FIG. 33 is a flowchart illustrating periodical cloud states based on PV station power output.

Overcast days are readily identifiable since their PEs for morning, noon, and evening are characterized by having a small value when compared to cloudy and sunny cloud states. Through analyzing historical weather data and cross-referencing with corresponding PV power output, it was found that overcast periods exhibit a maximum PE value of 640 kWh for all periods for the described 1MW PV station. Further, sunny and cloudy periods exhibit similar output energy levels. However, periodical Euclidean norms vastly differ between both. It was found that cloudy periods experience elevated values of PUN, averaging in 25,000 units, whereas sunny periods exhibit average values of 15,500 units with a maximum of 18,500 units. Therefore, PUNS are used to identify both sunny and cloudy periods. The flowchart in FIG. 33 describes the full process used to identify periodical cloud states.

Figure 34:
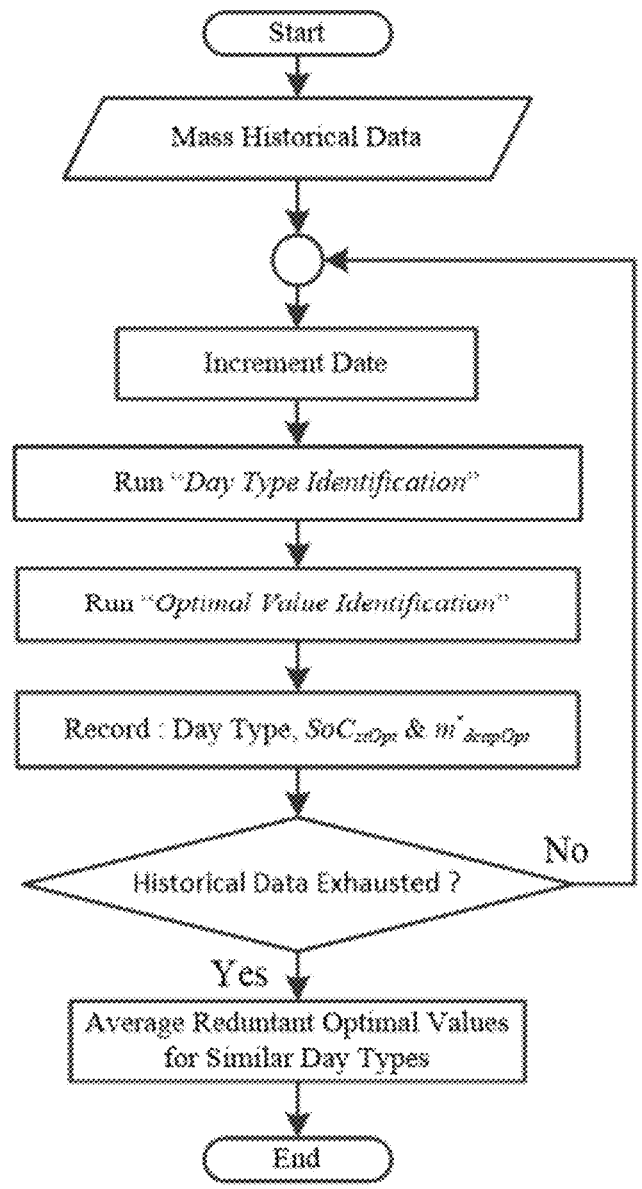
FIG. 34 is a flowchart illustrating the deduction of average optimal values for different day types utilizing mass historical data.

After identifying the cloud state for each period, the day type is specified according to TABLE I. Mass historical PV data is analyzed and optimal firming values are deduced for each identified day type according to the flowchart sequence shown in FIG. 34.

The described routine is allowed to process historical data yielding the optimal values for different sample day types shown in TABLE II.

TABLE II

Optimal value lookup table for sample day types

| Day Type | Avg. Mor. PE (kWh) | Avg. Noon PE (kWh) | Avg. Ev. PE (kWh) | Avg. Mor. PUN (×10$^4$) | Avg. Noon PUN (×10$^4$) | Avg. Ev. PUN (×10$^4$) | Avg. $m^\bullet_{dcapOpt}$ (×10$^{-4}$) | Avg. SoCstOpt (%) |
| --- | --- | --- | --- | --- | --- | --- | --- | --- |
| 1 | 1549 | 2702 | 1310 | 1.14 | 1.36 | 1.34 | 3.020 | 43.4 |
| 14 | 1222 | 2917 | 1056 | 2.40 | 4.28 | 2.56 | 1.188 | 14.2 |
| 15 | 1205 | 2530 | 424 | 3.05 | 6.10 | 1.20 | 3.350 | 38.4 |
| 19 | 481 | 2322 | 1840 | 1.39 | 1.66 | 1.25 | 2.862 | 35.3 |

TABLE II-continued

Optimal value lookup table for sample day types

| Day Type | Avg. Mor. PE (kWh) | Avg. Noon PE (kWh) | Avg. Ev. PE (kWh) | Avg. Mor. PUN (×10⁴) | Avg. Noon PUN (×10⁴) | Avg. Ev. PUN (×10⁴) | Avg. $m^\bullet_{dCapOpt}$ (×10⁻⁴) | Avg. SoCstOpt (%) |
|---|---|---|---|---|---|---|---|---|
| 21 | 207 | 899 | 258 | 1.29 | 1.64 | 1.35 | 3.252 | 53.8 |
| 22 | 316 | 1768 | 1155 | 1.45 | 3.05 | 1.84 | 2.414 | 42.1 |
| 23 | 174 | 1083 | 802 | 8.91 | 2.12 | 2.02 | 3.768 | 0.315 |
| 24 | 356 | 1357 | 416 | 1.70 | 3.29 | 1.72 | 1.999 | 57.0 |
| 27 | 288 | 391 | 102 | 1.06 | 1.33 | 1.26 | 3.340 | 52.4 |

An Application Programming Interface (API) is set up to import daily, location specific cloud state forecasts from a host website. The day type is identified according to the cloud state forecast and optimal algorithm values are imported from the recorded lookup table. Further, the BESS SoC is conditioned such that its value at the commencement of the firming period is equal to $SoC_{stOpt}$. The value of $m^\bullet_{dCap}$ is set to the day type optimal value ($m^\bullet_{dCapOpt}$).

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An energy storage system controller, comprising:
   an energy storage system coupled to a power distribution system including renewable generation resources; and
   a processor in communication with the energy storage system and the power distribution system, wherein the processor obtains real time data streams from different points of the power distribution system and records the real time data streams locally to establish a historical database for the different points of the power distribution system to deduce a required energy storage system active power reference to achieve an optimal firming degree for distribution feeder power by executing:
      a renewables capacity firming algorithm operable for conditioning intermittent power of a renewable energy station using real time and recorded historical input data such that it is made more stable and non-intermittent, wherein the renewables capacity firming algorithm comprises an intermittency detection algorithm that tracks a rate of change of a difference between output power and a power reference curve and, if dual thresholds are exceeded, a power swing is identified and firming is commenced, and, if the output power is non-intermittent for a predetermined period of time, firming is rested; and
      a peak load shaving algorithm operable for ensuring that the energy storage system is capable of transmitting full power capacity at a predicted feeder peak load time determined by the processor from real time and recorded historical input data;
   wherein the performance of the renewables capacity firming algorithm and the performance of the peak load shaving algorithm are optimized in parallel; and
   wherein energy is selectively transferred between the energy storage system and the power distribution system at the direction of the processor.

2. The energy storage system controller of claim 1, wherein the renewable energy station comprises one of a photovoltaic energy station and a wind energy station.

3. The energy storage system controller of claim 1, wherein the renewables capacity firming algorithm is operable for determining a reference power value to determine optimal power output of the energy storage system during power swings taking into account renewable energy station characteristics.

4. The energy storage system controller of claim 1, wherein the renewables capacity firming algorithm implements an adaptive filtering control methodology.

5. The energy storage system controller of claim 1, wherein the renewables capacity firming algorithm is operable for developing a characteristic power curve based on daily power output derived from the recorded historical input data of a renewable energy source.

6. The energy storage system controller of claim 1, wherein the renewables capacity firming algorithm is operable for developing a firming power reference that considers real time power swing magnitudes, energy storage system capacity, and target state-of-charge at an end of a firming period.

7. The energy storage system controller of claim 1, wherein the renewables capacity firming algorithm is operable for implementing an intermittency detection algorithm that triggers the energy storage system to commence and halt firming based on a renewable energy facility output ramp rate.

8. An energy storage system controller, comprising:
   an energy storage system coupled to a power distribution system including renewable generation resources; and
   a processor in communication with the energy storage system and the power distribution system, wherein the processor obtains real time data streams from different points of the power distribution system and records the real time data streams locally to establish a historical database for the different points of the power distribution system to deduce a required energy storage system active power reference to achieve an optimal firming degree for distribution feeder power by executing:
      a renewables capacity firming algorithm operable for conditioning intermittent power of a renewable energy station using real time and recorded historical input data such that it is made more stable and non-intermittent, wherein the renewables capacity firming algorithm utilizes one or more parameter values associated with comparable time periods taking into account one or more factors comprising cloud state, wherein the renewables capacity firming algorithm comprises an intermittency detection algorithm that tracks a rate of change of a difference between output power and a power reference curve and, if dual thresholds are exceeded, a power swing is identified and firming is commenced, and, if the output power is non-intermittent for a predetermined period of time, firming is rested; and a peak load shaving algorithm operable for ensuring that the energy storage system is capable of transmitting full power capacity at a predicted feeder peak load time determined by the processor from real time and recorded historical input data;

wherein the performance of the renewables capacity firming algorithm and the performance of the peak load shaving algorithm are optimized in parallel; and wherein energy is selectively transferred between the energy storage system and the power distribution system at the direction of the processor.

9. The energy storage system controller of claim 8, wherein the renewable energy station comprises one of a photovoltaic energy station and a wind energy station.

10. The energy storage system controller of claim 8, wherein the renewables capacity firming algorithm is operable for determining a reference power value to determine optimal power output of the energy storage system during power swings taking into account renewable energy station characteristics.

11. The energy storage system controller of claim 8, wherein the renewables capacity firming algorithm implements an adaptive filtering control methodology.

12. The energy storage system controller of claim 8, wherein the renewables capacity firming algorithm is operable for developing a characteristic power curve based on daily power output derived from the recorded historical input data of a renewable energy source.

13. The energy storage system controller of claim 8, wherein the renewables capacity firming algorithm is operable for developing a firming power reference that considers real time power swing magnitudes, energy storage system capacity, and target state-of-charge at an end of a firming period.

14. The energy storage system controller of claim 8, wherein the renewables capacity firming algorithm is operable for implementing an intermittency detection algorithm that triggers the energy storage system to commence and halt firming based on a renewable energy facility output ramp rate.

15. The energy storage system controller of claim 8, wherein the renewables capacity firming algorithm utilizes one or more parameters based on predefined day types and associated cloud cover characteristics correlating to power requirements.

* * * * *